(12) United States Patent
Iwashita

(10) Patent No.: US 7,073,167 B2
(45) Date of Patent: Jul. 4, 2006

(54) COMPILER SYSTEM COMPILING METHOD, AND STORAGE MEDIUM FOR STORING COMPILING PROGRAM

(75) Inventor: Hidetoshi Iwashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 09/835,623

(22) Filed: Apr. 17, 2001

(65) Prior Publication Data
US 2004/0205729 A1 Oct. 14, 2004

Related U.S. Application Data

(63) Continuation of application No. PCT/JP99/00381, filed on Jan. 29, 1999.

(51) Int. Cl.
*G06F 9/45* (2006.01)
*G06F 9/44* (2006.01)

(52) U.S. Cl. .............. 717/140; 717/146; 717/148; 717/151; 717/152; 717/154; 717/159; 717/164

(58) Field of Classification Search ............... 717/140, 717/146, 148, 151, 152, 154, 159, 164
See application file for complete search history.

(56) References Cited

U.S. PATENT DOCUMENTS

| | | | | |
|---|---|---|---|---|
| 5,488,717 A | * | 1/1996 | Gibson et al. ............ | 707/2 |
| 5,598,564 A | * | 1/1997 | Barker, III ............... | 717/126 |
| 5,617,564 A | * | 4/1997 | Tomotake ................ | 707/200 |
| 5,699,310 A | * | 12/1997 | Garloff et al. ........... | 717/108 |
| 5,701,489 A | * | 12/1997 | Bates et al. ............. | 717/157 |
| 5,740,443 A | * | 4/1998 | Carini ..................... | 717/133 |
| 5,822,591 A | * | 10/1998 | Hochmuth ................ | 717/148 |
| 5,835,771 A | * | 11/1998 | Veldhuizen .............. | 717/154 |
| 5,925,109 A | * | 7/1999 | Bartz ....................... | 710/14 |
| 6,161,217 A | * | 12/2000 | Detlefs et al. .......... | 717/151 |
| 6,195,793 B1 | * | 2/2001 | Schmidt ................... | 717/151 |
| 6,223,340 B1 | * | 4/2001 | Detlefs .................... | 717/145 |
| 6,292,940 B1 | * | 9/2001 | Sato ........................ | 717/157 |
| 6,574,790 B1 | * | 6/2003 | Abramson et al. ...... | 717/100 |
| 6,704,924 B1 | * | 3/2004 | Hasha ...................... | 717/136 |

FOREIGN PATENT DOCUMENTS

| | | |
|---|---|---|
| JP | 63-115236 | 5/1988 |
| JP | 8-263272 | 10/1996 |
| JP | 9-128246 | 5/1997 |

OTHER PUBLICATIONS

A. Griewank, D. Juedes, J. Utke, "Algorithm 755: ADOL–C: A Package for the Automatic Differentiation of Algorithms Written in C/C++", 1996, ACM, p. 131–167.*
J. D. Ramsdell, "CST: C State Transformers", 1995, ACM, p. 32–36.*
A. C. Staugaard, Jr., "Structured and Object–Oriented Techniques: An Introduction Using C++", 1997, Prentice–Hall, Inc., Second Edition, p. 70–72.*

* cited by examiner

*Primary Examiner*—Wei Y. Zhen
*Assistant Examiner*—Qamrun Nahar
(74) *Attorney, Agent, or Firm*—Staas & Halsey LLP

(57) ABSTRACT

A compiler has a detection unit, a conversion unit, and a expansion unit. The detection unit detects a predetermined target from an input source program. The conversion unit converts the target detected by the detection unit into a procedure call. The expansion unit generates an online code describing a definition of a procedure to be called by the procedure call obtained by the detection unit. The compiler outputs a program in which the target detected by the detection unit is replaced with a procedure call, and an online code corresponding to the procedure call.

11 Claims, 30 Drawing Sheets

```
1    SUBROUTINE SUB(A,N)
2    INTEGER N
3    REAL A(ABS(N))
4    WRITE(*,*) A
5    END SUBROUTINE
```

FIG. 1A

PRIOR ART

```
1    SUBROUTINE SUB(A,N)
2    INTEGER N
     IF (N.GE.0) THEN          ! EXPANSION CODE
        TMP = N                ! EXPANSION CODE
     ELSE                      ! EXPANSION CODE
        TMP = -N               ! EXPANSION CODE
     END IF                    ! EXPANSION CODE
3    REAL A(TMP)
4    WRITE(*,*) A
5    END SUBROUTINE
```

FIG. 1B

PRIOR ART

```
1     char *copy_string(char *s)
2     {
3       int i;
4       char *buffer = (char*)malloc(strlen(s) + 1);
5
6       for (i = 0; s[i] != '\0'; ++i)
7         buffer[i] = s[i];
8
9       return buffer;
10    }
```

FIG. 2A

PRIOR ART

```
1     char *copy_string(char *s)
2     {
3       int i;
  char *p; /* EXPANSION CODE */
  int tmp; /* EXPANSION CODE */
  tmp = 0; /* EXPANSION CODE */
  for (p = s; *p != '\0'; ++p) /* EXPANSION CODE */
    ++tmp; /* EXPANSION CODE */
4       char *buffer = (char*)malloc(tmp + 1);
5
6       for (i = 0; s[i] != '\0'; ++i)
7         buffer[i] = s[i];
8
9       return buffer;
10    }
```

FIG. 2B

PRIOR ART

```
1       IF (Z.GT.EPS) THEN
2          A=B1
3       ELSE IF(ABS(Z).LE.EPS) THEN
4          A=B2
5       ELSE
6          A=B3
7       END IF
```

FIG. 3A
PRIOR ART

```
1        IF (Z.GT.EPS) THEN
2           A=B1
3a       ELSE
            IF (Z.GE.0.0) THEN       ! EXPANSION CODE
              TMP = Z                ! EXPANSION CODE
            ELSE                     ! EXPANSION CODE
              TMP = -Z               ! EXPANSION CODE
            END IF                   ! EXPANSION CODE
3b          IF(TMP.LE.EPS) THEN
4              A=B2
5           ELSE
6              A=B3
3c          END IF
7        END IF
```

FIG. 3B
PRIOR ART

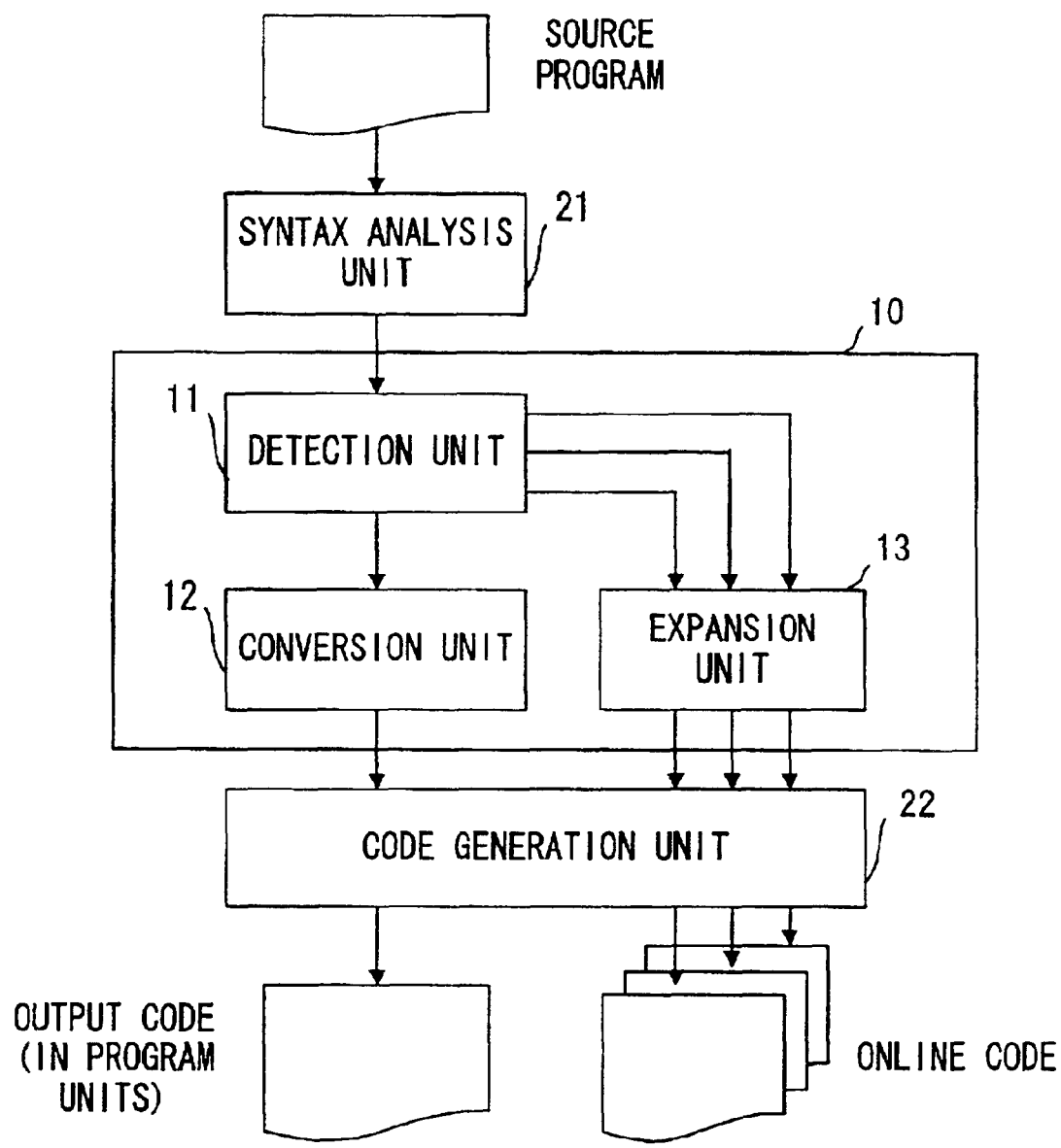
F I G. 5

```
1       PROGRAM SAMPL
2       INTEGER N(100)
3       REAL A(10,20,30),B
        ...
4       B = SUM(A)
5       WRITE(*,*) SUM(N(51:100))
6       END
```

FIG. 7A

```
1       PROGRAM SAMPL
2       INTEGER N(100)
3       REAL A(10,20,30),B
        ...
4       B = SUM_SAMPL_1(A)
5       WRITE(*,*) SUM_SAMPL_2(N(51:100))
6       END
```

FIG. 7B

```
     arg-type FUNCTION SUM(X)
     arg-type X(lb(1):ub(1), ..., lb(m):ub(m))
     SUM = 0
     DO 999 Im = lb(m), ub(m)
        ⋮
     DO 999 I1 = lb(1), ub(1)
       SUM = SUM+X(I1,...,Im)
999  CONTINUE
     RETURN
     END
```

FIG. 8

```
      REAL FUNCTION SUM_SAMPL_1(X)
      REAL X(1:10,1:20,1:30)
      SUM_SAMPL_1 = 0
      DO 999 I3 = 1, 30
      DO 999 I2 = 1, 20
      DO 999 I1 = 1, 10
        SUM_SAMPL_1 = SUM_SAMPL_1+X(I1,I2,I3)
  999 CONTINUE
      RETURN
      END
```

FIG. 9A

```
      INTEGER FUNCTION SUM_SAMPL_2(X)
      INTEGER X(51:100)
      SUM_SAMPL_2 = 0
      DO 999 I1 = 51, 100
        SUM_SAMPL_2 = SUM_SAMPL_2+X(I1)
  999 CONTINUE
      RETURN
      END
```

FIG. 9B

INPUT: PROGRAM UNIT P
OUTPUT: P' OBTAINED BY AMENDING P, AND PROCEDURE S1,..., Sm($0 \leq m \leq n$)
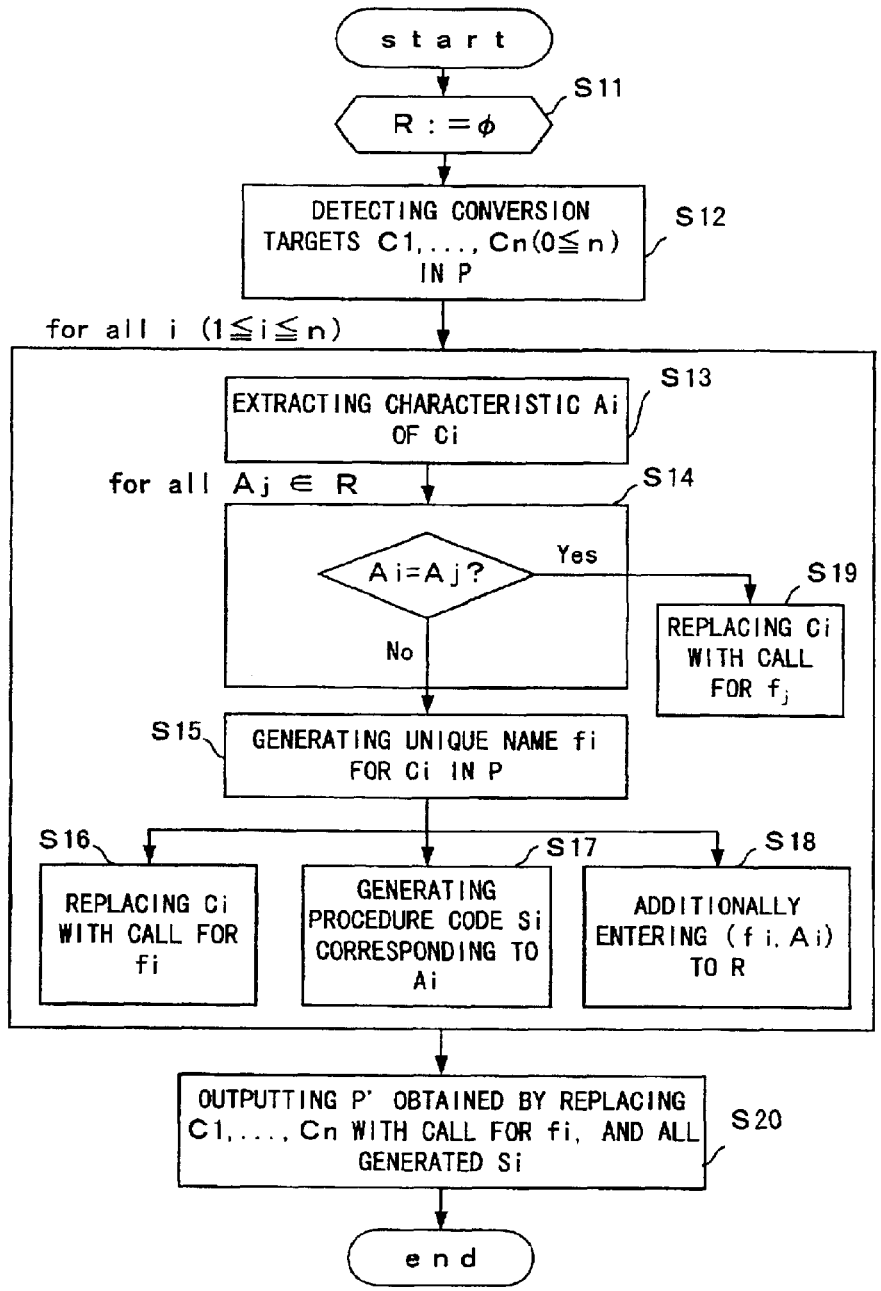
F I G. 1 1

```
1       PROGRAM SAMPL
2       INTEGER N(100),M(200)
3       REAL A(10,20,30),A2(10,20,30),B
        ...
4       B = SUM(A)+SUM(A2)
5       WRITE(*,*) SUM(N(51:100))
6       WRITE(*,*) SUM(M(51:200))
7       END
```

FIG. 12A

```
1       PROGRAM SAMPL
2       INTEGER N(100),M(200)
3       REAL A(10,20,30),A2(10,20,30),B
        ...
4       B = SUM_SAMPL_1(A)+SUM_SAMPL_1(A2)
5       WRITE(*,*) SUM_SAMPL_2(N(51:100))
6       WRITE(*,*) SUM_SAMPL_3(M(51:200))
7       END
```

FIG. 12B

| CALL | arg-type | m | lb(1) | ub(1) | lb(2) | ub(2) | lb(3) | ub(3) |
|---|---|---|---|---|---|---|---|---|
| SUM_SAMPL_1 | REAL | 3 | 1 | 10 | 1 | 20 | 1 | 30 |

FIG. 13A

| CALL | arg-type | m | lb(1) | ub(1) | lb(2) | ub(2) | lb(3) | ub(3) |
|---|---|---|---|---|---|---|---|---|
| SUM_SAMPL_1 | REAL | 3 | 1 | 10 | 1 | 20 | 1 | 30 |
| NEWLY EXTRACTED CALL | REAL | 3 | 1 | 10 | 1 | 20 | 1 | 30 |

FIG. 13B

| CALL | arg-type | m | lb(1) | ub(1) | lb(2) | ub(2) | lb(3) | ub(3) |
|---|---|---|---|---|---|---|---|---|
| SUM_SAMPL_1 | REAL | 3 | 1 | 10 | 1 | 20 | 1 | 30 |
| NEWLY EXTRACTED CALL | INTEGER | 1 | 51 | 100 | – | – | – | – |

FIG. 13C

| CALL | arg-type | m | lb(1) | ub(1) | lb(2) | ub(2) | lb(3) | ub(3) |
|---|---|---|---|---|---|---|---|---|
| SUM_SAMPL_1 | REAL | 3 | 1 | 10 | 1 | 20 | 1 | 30 |
| SUM_SAMPL_2 | INTEGER | 1 | 51 | 100 | – | – | – | – |
| NEWLY EXTRACTED CALL | INTEGER | 1 | 51 | 200 | – | – | – | – |

FIG. 13D

```
      INTEGER FUNCTION SUM_SAMPL_3(X)
      INTEGER X(51:200)
      SUM_SAMPL_3 = 0
      DO 999 I1 = 51, 200
        SUM_SAMPL_3 = SUM_SAMPL_3+X(I1)
  999 CONTINUE
      RETURN
      END
```

FIG. 14

```
arg-type FUNCTION SUM(X)
arg-type X(:,···,:)
         ⎵⎵⎵⎵
           m      ~ABSTRACTION
SUM = 0
DO 999 Im = LBOUND(X,m), UBOUND(X,m)
      ⋮
DO 999 I1 = LBOUND(X,1), UBOUND(X,1)
  SUM = SUM+X(I1,···,Im)
999 CONTINUE
    RETURN
    END
```

FIG. 15

| CALL | arg-type | m |
|---|---|---|
| SUM(A) | REAL | 3 |
| SUM(A2) | REAL | 3 |
| SUM(N(51:100)) | INTEGER | 1 |
| SUM(M(51:200)) | INTEGER | 1 |

FIG. 16

```
      PROGRAM SAMPL
      INTEGER N(100),M(200)
      REAL A(10,20,30),A2(10,20,30),B
      ...
      B = SUM_SAMPL_1(A)+SUM_SAMPL_1(A2)
      WRITE(*,*) SUM_SAMPL_2(N(51:100))
      WRITE(*,*) SUM_SAMPL_2(M(51:200))
      END
```
} OBJECT CODE

```
      REAL FUNCTION SUM_SAMPL_1(X)
      REAL X(:,:,:)
      SUM_SAMPL_1 = 0
      DO 999 I3 = LBOUND(X,3),UBOUND(X,3)
      DO 999 I2 = LBOUND(X,2),UBOUND(X,2)
      DO 999 I1 = LBOUND(X,1),UBOUND(X,1)
        SUM_SAMPL_1 = SUM_SAMPL_1+X(I1,I2,I3)
  999 CONTINUE
      RETURN
      END
```
} PROCEDURE CODE A

```
      INTEGER FUNCTION SUM_SAMPL_2(X)
      INTEGER X(:)
      SUM_SAMPL_2 = 0
      DO 999 I1 = LBOUND(X,1),UBOUND(X,1)
        SUM_SAMPL_2 = SUM_SAMPL_2+X(I1)
  999 CONTINUE
      RETURN
      END
```
} PROCEDURE CODE B

FIG. 17

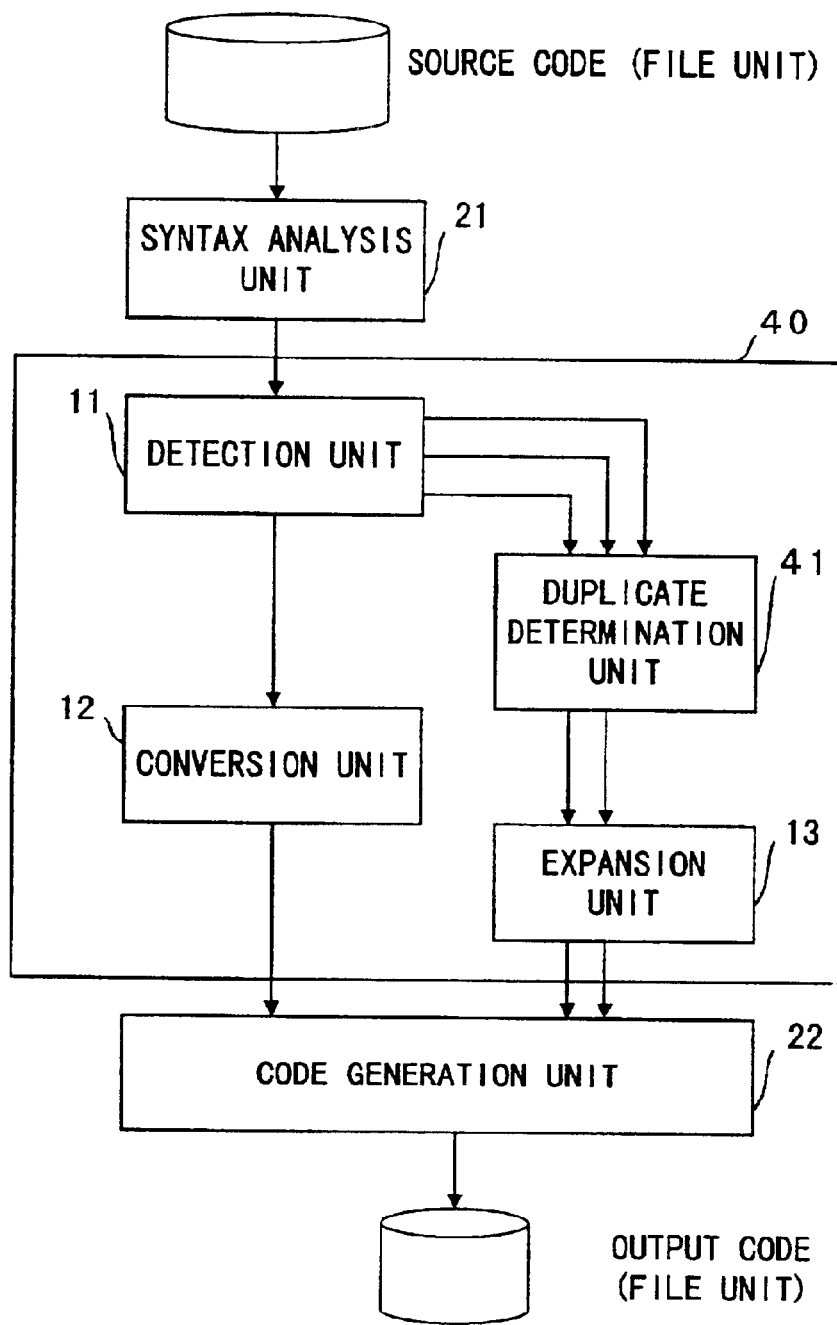
F I G. 1 8

```
C--- main program ----
      PROGRAM SAMPL
      INTEGER N(100)
      REAL A(10,20,30),A2(10,20,30),B
      ...
      B = SUM(A)
      B = SUM_AND_ADD(A,B)
      WRITE(*,*) SUM(N(51:100))
      END
C--- subprogram ----
      REAL FUNCTION SUM_AND_ADD(Q,S)
      REAL Q(10,20,30),S
      SUM_AND_ADD = SUM(Q)+S
      RETURN
      END
C--- end of user programs ----
```

F I G. 20

```
C-- main program ----
      PROGRAM SAMPL
      INTEGER N(100)
      REAL A(10,20,30),A2(10,20,30),B
      ...
      B = SUM_TINY_1(A)
      B = SUM_AND_ADD(A,B)
      WRITE(*,*) SUM_TINY_2(N(51:100))
      END
C-- subprogram ----
      REAL FUNCTION SUM_AND_ADD(Q,S)
      REAL Q(10,20,30),S
      SUM_AND_ADD = SUM_TINY_1(Q)+S
      RETURN
      END
C-- end of user programs ----
      REAL FUNCTION SUM_TINY_1(X)          ⎫
      REAL X(1:10,1:20,1:30)                |
      SUM_TINY_1 = 0                        |
      DO 999 I3 = 1, 30                     |
      DO 999 I2 = 1, 20                     ⎬ PROCEDURE
      DO 999 I1 = 1, 10                     |  CODE A
        SUM_TINY_1 = SUM_TINY_1+X(I1,I2,I3) |
  999 CONTINUE                              |
      RETURN                                |
      END                                   ⎭

INTEGER FUNCTION SUM_TINY_2(X)       ⎫
      INTEGER X(51:100)                     |
      SUM_TINY_2 = 0                        |
      DO 999 I1 = 51, 100                   ⎬ PROCEDURE
        SUM_TINY_2 = SUM_TINY_2+X(I1)       |  CODE B
  999 CONTINUE                              |
      RETURN                                |
      END                                   ⎭
```

FIG. 21

```
FILE tiny1.f:
------------------------------------------------------------
C-- main program ----
      PROGRAM SAMPL
      INTEGER N(100)
      REAL A(10,20,30),A2(10,20,30),B
      ...
      B = SUM(A)
      B = SUM_AND_ADD(A,B)
      WRITE(*,*) SUM(N(51:100))
      END
C-- end of main program ----
------------------------------------------------------------
FILE tiny2.f:
------------------------------------------------------------
C-- subprogram ----
      REAL FUNCTION SUM_AND_ADD(Q,S)
      REAL Q(10,20,30),S
      SUM_AND_ADD = SUM(Q)+S
      RETURN
      END
C-- end of subprogram ----
------------------------------------------------------------
```

FIG. 24

```
       FILE  tiny1.o:
━━━━━━━━━━━━━━━━━━━━━━━━━━━━━━━━━━━━━━━━━━━━━━━━
C-- main program ----
       PROGRAM SAMPL
       INTEGER N(100)
       REAL A(10,20,30),A2(10,20,30),B
       ...
       B = SUM_1(A)
       B = SUM_AND_ADD(A,B)
       WRITE(*,*) SUM_2(N(51:100))
       END
C-- end of main program ----
━━━━━━━━━━━━━━━━━━━━━━━━━━━━━━━━━━━━━━━━━━━━━━━━
       FILE  tiny2.o:
━━━━━━━━━━━━━━━━━━━━━━━━━━━━━━━━━━━━━━━━━━━━━━━━
C-- subprogram ----
       REAL FUNCTION SUM_AND_ADD(Q,S)
       REAL Q(10,20,30),S
       SUM_AND_ADD = SUM_1(Q)+S
       RETURN
       END
C-- end of subprogram ----
━━━━━━━━━━━━━━━━━━━━━━━━━━━━━━━━━━━━━━━━━━━━━━━━
       FILE  onlines.o:
━━━━━━━━━━━━━━━━━━━━━━━━━━━━━━━━━━━━━━━━━━━━━━━━
       REAL FUNCTION SUM_1(X)       ⎫
       REAL X(1:10,1:20,1:30)       ⎪
       SUM_1 = 0                    ⎪
       DO 999 I3 = 1, 30            ⎬ PROCEDURE
       DO 999 I2 = 1, 20            ⎪ CODE A
       DO 999 I1 = 1, 10            ⎪
         SUM_1 = SUM_1+X(I1,I2,I3)  ⎭
   999 CONTINUE
       RETURN
       END INTEGER FUNCTION SUM_2(X)    ⎫
       INTEGER X(51:100)            ⎪
       SUM_2 = 0                    ⎬ PROCEDURE
       DO 999 I1 = 51, 100          ⎪ CODE B
         SUM_2 = SUM_2+X(I1)        ⎪
   999 CONTINUE                     ⎪
       RETURN                       ⎪
       END                          ⎭
━━━━━━━━━━━━━━━━━━━━━━━━━━━━━━━━━━━━━━━━━━━━━━━━
```

FIG. 25

```
1    SUBROUTINE SUBP(LEN)
2    REAL,PARAMETER :: PAI=3.14159, R=100.0
3    INTEGER LEN,M
4    REAL :: S(2**LEN-1)
     ...
5    M=PAI*(R*2)**2
     ...
6    END SUBROUTINE
```

FIG. 26A

```
SUBROUTINE SUBP(LEN)
REAL,PARAMETER :: PAI=3.14159, R=100.0
INTEGER LEN,M
REAL :: S(POW_SUBP_1(2,LEN)-1)
...
M=PAI*POW_SUBP_2((R*2),2)
...
END SUBROUTINE
```
} OBJECT PROGRAM

```
FUNCTION POW_SUBP_1(A,N) RESULT(R)
INTEGER A,R
INTEGER N

SELECT CASE (N)
CASE (0)
   R=1
CASE (1)
   R=A
CASE (2)
   R=A*A
CASE (3)
   R=A*A*A
CASE DEFAULT
   R=A**N
END SELECT
RETURN
END FUNCTION
```
} ONLINE CODE A

```
FUNCTION POW_SUBP_2(A,N) RESULT(R)
REAL A,R
INTEGER N

R=A*A
RETURN
END FUNCTION
```
} ONLINE CODE B

```
FUNCTION name(A,N) RESULT(R)
arg-type A,R
INTEGER N

R=1
RETURN
END FUNCTION
```

FIG. 27B

```
FUNCTION name(A,N) RESULT(R)
arg-type A,R
INTEGER N

R=A
RETURN
END FUNCTION
```

FIG. 27C

```
FUNCTION name(A,N) RESULT(R)
arg-type A,R
INTEGER N

R=A*A
RETURN
END FUNCTION
```

FIG. 27D

```
FUNCTION name(A,N) RESULT(R)
arg-type A,R
INTEGER N

R=A*A*A
RETURN
END FUNCTION
```

```
FUNCTION name(A,N) RESULT(R)
arg-type A,R
INTEGER N

R=A**N
RETURN
END FUNCTION
```

FIG. 28A

```
FUNCTION name(A,N) RESULT(R)
arg-type A,R
INTEGER N

SELECT CASE (N)
CASE (0)
   R=1
CASE (1)
   R=A
CASE (2)
   R=A*A
CASE (3)
   R=A*A*A
CASE DEFAULT
   R=A**N
END SELECT
RETURN
END FUNCTION
```

FIG. 28B

COMPILER SYSTEM COMPILING METHOD, AND STORAGE MEDIUM FOR STORING COMPILING PROGRAM

CROSS REFERENCE

This application is a continuation application of PCT/JP99/00381 which was filed on Jan. 29, 1999.

BACKGROUND OF THE INVENTION

1. Field of the Invention

The present invention relates to a compiler for compiling at least a part of an input program described in a language, and outputting the program described in the same or a different language. More specifically, the present invention relates to a preprocessor compiler in which an output program is written in Fortran or the C language.

2. Description of the Related Art

A programming language for describing the operation of a computer has been developed into various extended or improved languages depending on a use, a field of application, etc. For example, the HPF is well known as an extended language based on Fortran. As extended languages based on the C language, C++, C9x, DPCE, etc. are generally known.

However, when the programs, etc. described in the above described extended languages are translated into assembler or machine languages, it is often advantageous to first convert the extended languages into base languages. Therefore, in most cases, a compiler using any of these extended languages is realized by the preprocessor in which an output language is the base language of the extended language. For example, a compiler which converts a program described in the HPF into a program described in Fortran, and then outputs it has been developed.

The function SUM_SCATTER is called in the following format.

SUM_SCATTER(ARRAY, BASE, INDX1, INDX2, ..., INDXn, MASK)

where "ARRAY" is of an arbitrary value type, and indicates an array having an arbitrary dimensionality. A value type can be an integer type, a real type, a complex type, etc allowed by a process system. "BASE" is the same type as "ARRAY", and is an array having an arbitrary dimensionality. "INDX1, INDX2, . . , INDXn" is scalar or an array having the same dimensionality as "BASE". "n" has the same dimensionality as "ARRAY". "MASK" is scalar, an array having the same dimensionality as the "ARRAY", or can be omitted.

Therefore, if a process system has ten value types and supports arrays of one through seven dimensions, then a degree of freedom of the function can be computed as follows.

When "ARRAY" is one-dimension, a degree of freedom of the "ARRAY" is 10, a degree of freedom of the "BASE" is 7, and n=1. Accordingly, a degree of freedom of the "INDX1, INDX2, . . . , INDXn" is 2, and a degree of freedom of the "MASK" is 3. As a result, in this example, the number of combinations is $10 \times 7 \times 2 \times 3 = 420$. Similarly, the number of combinations when the "ARRAY" is two through seven dimensions can be computed as follows.

2-dimensional: $10 \times 7 \times 2^2 \times 3 = 840$ 3-dimensional: $10 \times 7 \times 2^3 \times 3 = 1680$

.
.
.

7-dimensional: $10 \times 7 \times 2^7 \times 3 = 26880$

Therefore, the total number of combinations is 53340. In addition, in the HPF, an array is normally arranged as divided into the number of processors and assigned thereto. Accordingly, the number of combinations is enormously large in consideration of the types of division arrangements (block, cyclic, etc.), a difference dimensions, a multi-dimensional division, etc.

As a result, when an built-in procedure of a high abstract level is converted using a common library, the following problem arises.

(1) If the conversion is applied to all combinations, the library becomes exceedingly large, thereby requiring a large storage medium (memory capacity) for storing the library.

(2) Even if an entry name corresponding to plural cases (a generic name, or an abstract name) is used, it is after all necessary to process each of the cases. Therefore, the problem (1) above cannot be solved.

(3) There is a method for preparing libraries of various types and in any dimensionality using an entry name (a generic name, or an abstract name). However, this method has the following problems.

(a) To correspond to the differences in dimensionality, the number of nests of a loop should be variable, which unfortunately cannot be described in Fortran or the C language. If it is described in a recursive call, then an execution speed is lowered.

(b) It is difficult to use a common type (for example, 4-byte integer type or a 8-byte real type). For example, if an integer-type value and a real-type value coexist in an equation in a program, then the processes should be performed for each type because these types are different in execution code from each other. Therefore, a number of determination branches appear in an instruction string, and the execution speed is lowered.

(c) In a language which supports an array divided for a plurality of processors as an argument, a simple division (for example, an equal block division in the final dimension) is processed similarly with a normal division (a method of performing an arbitrary dividing process in all dimensions), thereby lowering the execution speed.

Thus, when an built-in procedure of a high abstract level is converted by a preprocessor, a storage medium for storing a library becomes exceedingly large. Otherwise, if a user tries to avoid a large storage medium, then the compiling performance is lowered.

One of the methods for avoiding the above described problems is to generate (embody) only the part related to the call parameter in the built-in procedure, not to prepare a library for all parts of the built-in procedure. For example, there is a method for converting a procedure call in a source program based on the inline expansion technology.

However, in a preprocessor compiler, it is impossible or difficult to perform the inline expansion depending on the position where the procedure call appears. Described below is the problem.

(1) Normally, an execution statement cannot be expanded in a declaration part. Therefore, when a function call, etc. appears in the declaration part, it cannot be processed for inline expansion. If a function call, etc. appearing in the declaration part is processed for inline expansion as is, then an error occurs when the obtained program is translated using the compiler in a base language. For example, when the declaration part of the input program shown in FIG. 1A is compiled into a Fortran program, the code shown in FIG. 1B is obtained. When the declaration part of the input program shown in FIG. 2A is compiled into a C program, the code shown in FIG. 2B is obtained. In these examples, since an execution statement (the function ABS in the example shown in FIG. 1, and the function strlen(s) in the example shown in FIG. 2) is expanded in the declaration part, an error occurs if a program obtained as a compilation result is translated in a Fortran compiler or a C compiler.

(2) Also in the execution part, the inline expansion may not be executed depending on the syntax restrictions. For example, there is a restriction in Fortran 90 that an execution statement other than an assignment statement cannot be described in a "where statement". Therefore, the function appearing in a "where statement" may not be processed for inline expansion.

(3) It can be difficult to avoid a conflict for a name. For example, if an built-in function SUM is used in a procedure to be expanded, it is difficult to avoid the problem that the same names coexist when the variable name SUM is used on the called side, and the variable appears as a real argument.

(4) When an execution statement, etc. is expanded, it is not simply expanded the statement, but one or more codes around the statement may have to be converted depending on the context. For example, as shown in FIG. 3A, if a function call (the function ABS in the example shown in FIG. 3) appears in the condition clause of the ELSE IF statement in the input program, then it is necessary to convert the nest structure of the IF statement. Therefore, as shown in FIG. 3B, the inline expansion becomes complicated. In addition, when a call function appears in the condition clause of the DO WHILE statement in the input program, the function should be expanded both immediately before and in the loop. In this case, the inline expansion also becomes complicated. On the other hand, in the C language, for example, when the second or third expression in the parentheses of the "for statement" is to be expanded, the inline expansion also becomes complicated.

Thus, if an inline expansion can be performed when a program, etc. is compiled, there is a merit, for example, that the storage area for storing the information required for the compilation can be small. However, if an object language has restrictions on the position where a process procedure can be described, the inline expansion may be difficult, or cannot be executed. That is to say, in a compiler in which the object language such as a machine language or assembler has small restrictions on the position where an execution code appears, there arise few problems about the inline expansion. However, in a preprocessor compiler in which the object language such as Fortran or the C language has a number of restrictions on the position where an execution code appears, the above described problems frequently occur in the inline expansion.

SUMMARY OF THE INVENTION

The object of the present invention is to provide a preprocessor compiler with high execution speed and with small amount of the storage area for storing information for compiling.

The compiler system according to the present invention is based on the configuration in which an input first program is compiled into a second program, including: a conversion unit for converting a part of the first program into a procedure call and generating the second program; a generation unit for generating a code describing the definition of the procedure to be called by the procedure call; and an output unit for outputting the second program and the code generated by the generation unit.

When the second program is generated by compiling the first program, the code describing the definition of the procedure is generated in addition to (or independent from) the second program, and the second program contains the descriptions of the procedure call for calling the code. That is, an execution code is not expanded in the second program. Accordingly, even when the object language has restrictions on the position where the process procedure can be described, the second program without an error when it is executed can be obtained. In addition, the description of the second program is not complicated, and the second program can be translated by the base language compiler at a higher speed comparing with a method using the inline expansion. Furthermore, in this apparatus, it is not necessary to prepare information required for compilation for all combinations to be converted in the input program, thereby reducing the necessary memory capacity.

BRIEF DESCRIPTION OF THE DRAWINGS

FIGS. 1A and 1B show an example (1) in which the inline expansion cannot be performed by the conventional compiler;

FIGS. 2A and 2B show an example (2) in which the inline expansion cannot be performed by the conventional compiler;

FIGS. 3A and 3B show an example in which the inline expansion becomes complicated by the conventional compiler;

FIG. 5 is a block diagram of the compiler according to the embodiment of the present invention;

FIG. 7A shows an example of an input code to the compiler shown in FIG. 5;

FIG. 7B shows an example of an output code from the compiler shown in FIG. 5;

FIG. 8 shows an example of a template for expanding the function SUM;

FIGS. 9A and 9B show the result of expanding the function SUM using the template;

FIG. 11 is a flowchart of the operation of the compiler shown in FIG. 10;

FIG. 12A shows an example of an input code to the compiler shown in FIG. 10;

FIG. 12B shows an example of an output code from the compiler shown in FIG. 10;

FIGS. 13A through 13D show a management table used in determining a duplication;

FIG. 14 shows a result of expanding the function SUM;

FIG. 15 shows an example of a template generated in a highly abstract representation;

FIG. 16 shows a parameter compared when an object to be converted is expanded using the template shown in FIG. 15;

FIG. 17 shows an output from the compiler using the template shown in FIG. 15;

FIG. 18 is a block diagram of the compiler according to a further embodiment of the present invention;

FIG. 20 shows an example of an input code to the compiler shown in FIG. 18;

FIG. 21 shows an example of an output code from the compiler shown in FIG. 18;

FIG. 24 shows an example of an input code to the compiler shown in FIG. 22;

FIG. 25 shows an example of an output code from the compiler shown in FIG. 22;

FIG. 26A shows an example of an input code;

FIG. 26B shows an example of an output corresponding to the input code shown in FIG. 26A;

FIGS. 27A through 27D, FIG. 28A, and FIG. 28B show an example of a template;

DESCRIPTION OF THE PREFERRED EMBODIMENTS

The present invention relates to a preprocessor compiler for compiling at least a part of an input program. The preprocessor compiler (also referred to as a "pre-compiler") reads a source program, changes at least a part of the source program, and prepares for compiling the source program. Described below in the following embodiments are the functions in Fortran and the C language for converting a call in a source program (a call for calling a function, a subroutine, an built-in procedure such as a library, etc.) into an object code. The compiler according to the present embodiment can be applied to both cases where the source language is different from the object language, and they are the same as each other.

Figure 4:
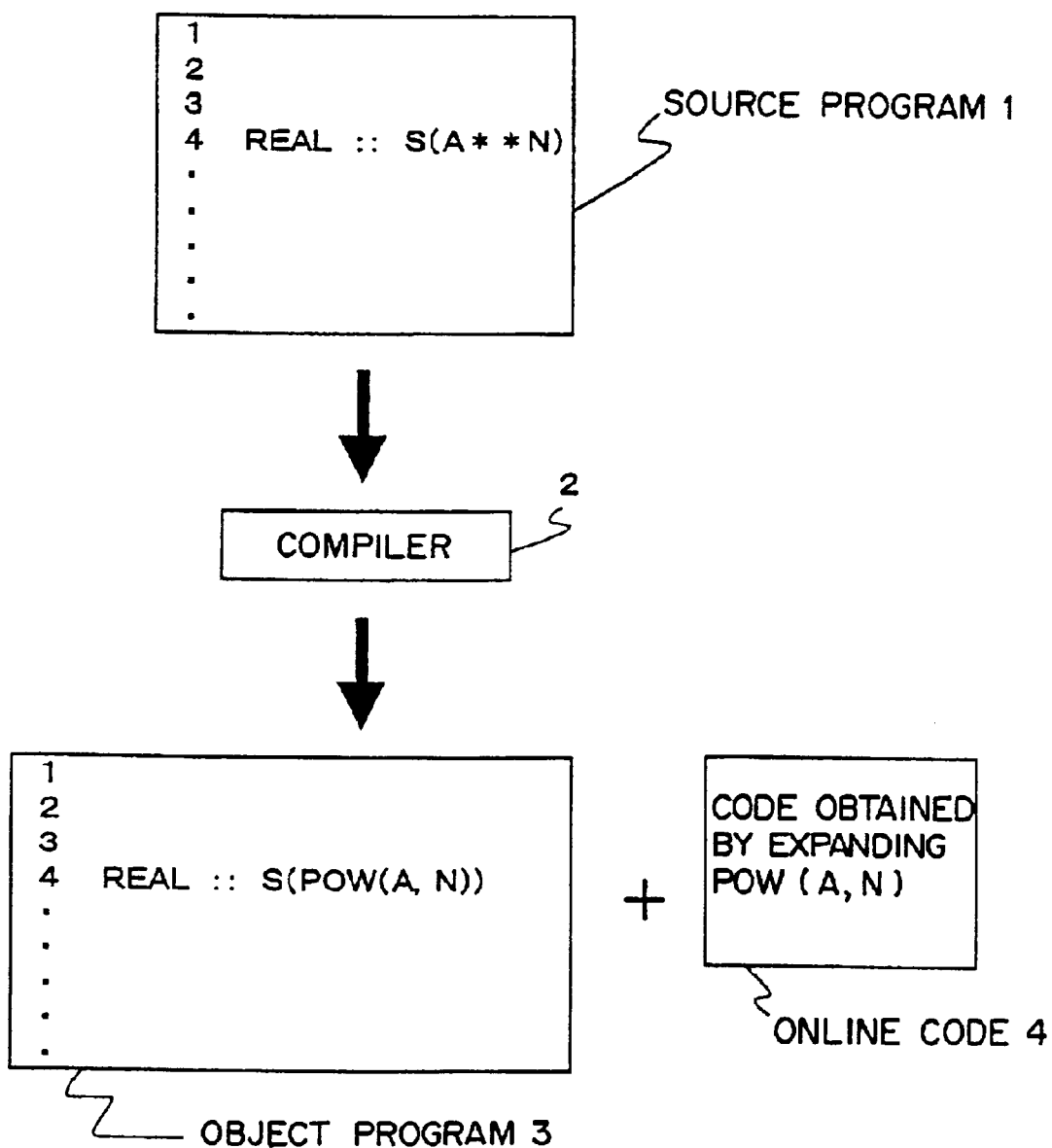
FIG. 4 shows an example of the outline of the operation of the compiler according to the embodiment of the present invention.

An example of the outline of the operations of the compiler according to the present embodiment will be explained with reference to FIG. 4. In this example, the source program 1 is described in the HPF which is one of the extended languages of the Fortran, and contains "AN". The "AN" indicates "A raised to the N-th power". The object language can be, for example, Fortran. In this case, a compiler 2 generates an object program 3 by, for example, converting the "A**N" in the source program 1 into "POW (A,N)", and outputs an online code 4 describing the procedure to be called by the "POW (A,N)". The procedure can be defined as, for example, "performing a multiplication when N is smaller than a predetermined value, and performing powers calculation when N is equal to or larger than the predetermined value". The online code 4 is obtained by online expanding for the procedure. The "online expanding" indicates expanding a procedure, etc. described in a program as a subprogram outside the program. The code obtained by online expanding a procedure is referred to as an "online code".

The compiler 2 adds the description (for example, an interface declaration) for calling the online code 4 to the object program 3 using a procedure call of the object program 3.

Thus, the compiler 2 generates a code to be called by a procedure call as the online code 4 outside the object program 3 when the object program 3 is generated by converting a part of the source program 1 into a procedure call. That is to say, a code to be called by a procedure call is not expanded in the object program 3. Therefore, even if there are restrictions on the position where a procedure can be described in an object language, no syntax errors, etc. occur when the object program 3 is executed.

FIG. 5 is a block diagram of the compiler according to the present embodiment. In this example, a source code is provided for each program.

A source program is input to a compiler 10 after being analyzed by a syntax analysis unit 21. The syntax analysis unit 21 has the function of converting an input code into an intermediate code, and can use an existing program as is.

The compiler 10 comprises a detection unit 11, a conversion unit 12, and an expansion unit 13. The detection unit 11 detects a conversion target. That is, the detection unit 11 detects a particular pattern (for example, a procedure call, etc.) from the source program. The conversion unit 12 determines the procedure name corresponding to the conversion target detected by the detection unit 11, and replaces the conversion target with the procedure name. The compiler 10 outputs the source program whose part has been converted by the conversion unit 12 as an object program. The expansion unit 13 generates an online code (a procedure code or an execution code) corresponding to the conversion target detected by the detection unit 11. The online code is called in association with the procedure name determined by the conversion unit 12 when the object program is executed. The compiler 10 outputs the online code generated by the expansion unit 13.

A code generation unit 22 translates the object program and the online code output by the compiler 10 into an assembler or a machine language, and individually outputs them. The code generation unit 22 can use an existing program as is, and can perform an optimizing process.

Figure 6:
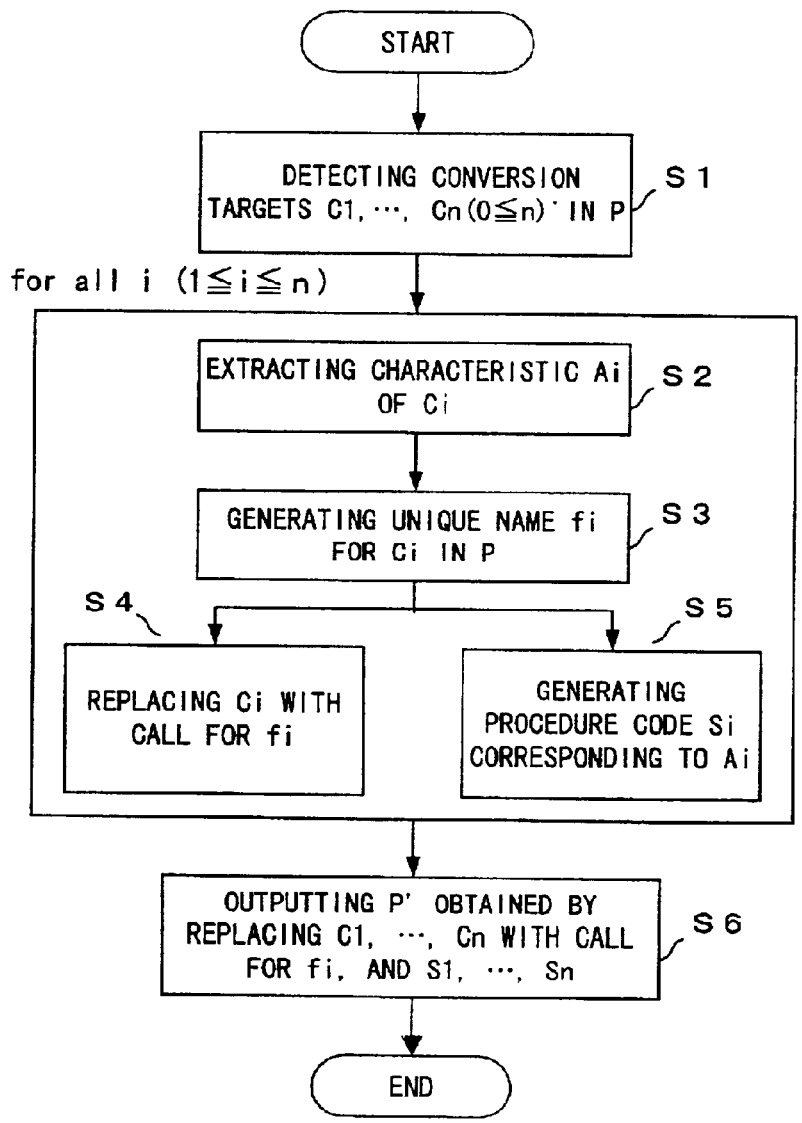
FIG. 6 is a flowchart of the operation of the compiler shown in FIG. 5.

FIG. 6 is a flowchart of the operations of the compiler 10 shown in FIG. 5. In this example, a source program input to the compiler 10 is referred to as a program P, and an object program compiled by the compiler is referred, to as a program P'. This process is performed each time one source program is input.

In step S1, conversion targets C1, ..., Cn to be converted in the program P are detected. The conversion targets C1, ..., Cn are, for example, calls of a function, a subroutine, and a library.

The processes in steps S2 through S5 are performed on each of the conversion targets C1, ..., Cn detected in step S1. In step S2, the characteristic Ai of the conversion target Ci is extracted. The "characteristic" indicates the name of a procedure to be called, for example, a function name, the dimension of an argument, a value type, etc. In step S3, a unique procedure name fi in the program P is generated for the conversion target Ci. That is to say, a different procedure name is assigned for each of the conversion targets C1, ..., Cn.

In step S4, the conversion target Ci is replaced with a call for the procedure fi. In this example, the "call for the procedure fi" refers to a call for calling the procedure fi when the program including the call is executed. In step S5, a procedure code Si corresponding to the characteristic Ai is generated. The procedure fi is specified as a procedure name of the procedure code Si. Thus, the procedure code Si is called by calling the procedure fi when the program is executed.

When the processes in steps in S2 through S5 are performed on all conversion targets C1, ..., Cn, each of the conversion targets C1, ..., Cn is replaced with a call for each of the procedures f1, ..., fn in the program P, and procedure codes S1, ..., Sn are generated corresponding to respective calls of the procedures f1, ..., fn. In step S6, a program P' obtained by replacing the conversion target Ci with a call for the procedure fi, and the generated procedure codes S1, ..., Sn are output. The program P' and the procedure codes S1, ..., Sn can be output to the same file, or can be output to different files. When the source code contains a plurality of program units, the above described processes are repeatedly performed for each of the program units.

Described below are practical embodiments of the present invention. In the following descriptions, it is assumed that a source program shown in FIG. 7 is input to the compiler 10, and a call for the function SUM is described as a conversion target. The function SUM is a function of returning a sum of elements of the array specified by an argument. The source program can be converted into an intermediate code.

When a source program is input, the compiler 10 detects a call for the function SUM by scanning the source program. In the example shown in FIG. 7A, it is detected that the SUM is being called by the "SUM(A)" in line 4, and the "SUM (N(51:100))" in line 5.

Then, the compiler 10 converts the "SUM (A)" into a call for the procedure with a unique name. In this embodiment, a newly generated name is determined by the combination of the procedure name of a conversion target, the name of a source program, and the appearance order in the source program. In this case, in the example shown in FIG. 7A, since the "SUM(A)" is the first conversion target in the program SAMPLE, a new procedure name "SUM_SAMPLE_1" is assigned. To avoid a duplication between the name newly generated by the compiler 10 and a user-defined variable name, etc., the compiler 10 can select a name not used by the user. For example, the use of a name by the user should be limited by reserving in advance a name starting with "xxx", or a name containing a character rarely used by the user such as "#" and "$" should be generated.

Then, the compiler 10 converts the line 4 of the source program as follows. At this time, the argument of the "SUM(A)" is used as the argument of the "SUM_SAMPLE_1".

"B=SUM(A)" into "B=SUM_SAMPLE_1(A)"

Then, the compiler 10 extracts the characteristic of the "SUM (A)" by analyzing the argument A. As a result, the following information can be obtained.

arg-type=REAL
m=3
lb(1)=1
ub(1)=10
lb(2)=1
ub(2)=20
lb(3)=1
ub(3)=30 where "arg-type" indicates the type of argument, "m" indicates the dimensionality of an argument, "lb(i)" and "ub(i)" respectively indicate the lower limit and the upper limit of the i-th dimension of the argument.

The compiler uses a template when generating a procedure code of "SUM_SAMPLE_1". The template is a sample of expanding a predetermined conversion target, and is stored in a database, etc. FIG. 8 shows an example of a template for expanding the function SUM.

The template is generated in the abstract representation, and a corresponding procedure code is generated by customizing the template depending on the characteristic of a conversion target. In addition, a plurality of templates can be provided for each call. For example, plural types of templates are provided for an important call, and an appropriate template can be selected from among the plurality of templates depending on the characteristic of the call. Furthermore, a template can be generated in a processing program for generating a practical source code or an object code using a procedure argument as a parameter.

The compiler 10 generates a procedure code about the "SUM_SAMPLE_1(A)" according to the information obtained by analyzing the argument A using the template shown in FIG. 8. FIG. 9A shows an example of the procedure code obtained in this method.

A procedure code is practically generated as follows. In this example, since the type of the argument A is "REAL", the "REAL" is written as an "arg-type" in the template shown in FIG. 8. In addition, "1", "10", "1", "20", "1", "30" are written as the lower limit and the upper limit of each dimension of the argument. Furthermore, "SUM_SAMPLE_1" is written as a procedure name to allow the code to be called by "SUM_SAMPLE_1(A)".

The process for "SUM (N (51:100))" is basically the same as the process for "SUM(A)". That is, the compiler 10 converts the "SUM(N(51:100))" into the call for the procedure with a unique name. In the example shown in FIG. 7A, since the "SUM(N(51:100))" is the function SUM secondly appearing in the program SAMPLE, the "SUM_SAMPLE_2" is assigned as a new procedure name. Then, the compiler 10 converts the line 5 of the source program as follows.

"WRITE(*,*) SUM(N(51:100))" into "WRITE (*,*) SUM_SAMPLE_2(N(51:100))"

Then, the compiler 10 analyzes the argument, and extracts the characteristic of the "SUM(N(51:100))". Thus, the following information can be obtained.

arg-type=INTEGER
m=1
lb(1)=51
ub(1)=100

Next, the compiler 10 generates a procedure code for the "SUM_SAMPLE_2(N(51:100))" using the template shown in FIG. 8. FIG. 9B shows an example of a generated procedure code.

FIG. 7B shows a result of compiling the source program shown in FIG. 7A using the compiler 10, and corresponds to the program P' in the flowchart shown in FIG. 6. When a plurality of conversion targets (a call for calling the function SUM) exist in the source program as shown in FIGS. 7A and 7B, the compiler 10 replaces the conversion targets with procedure calls which can be identified from each other by assigning different procedure names to the conversion targets. The code (object programs) obtained in the converting process are output to files as program code as shown in FIG. 7B or corresponding object codes. The compiler 10 generates and outputs a procedure code for each of the procedure calls. The compiler 10 can collectively output a plurality of procedure codes, or can sequentially output a procedure code each time it is generated.

As described above, when the source program shown in FIG. 7A is input, the compiler 10 outputs the object code shown in FIG. 7B and the procedure codes shown in FIGS. 9A and 9B. The procedure code is not expanded in the object code. Therefore, even if the object language of the compiler 10 has the restrictions on the position where a procedure code can be described, the compilation result will not infringe the restrictions.

Conventionally, for example, Fortran and the C language cannot expand an executable statement in the declaration part of a program. Therefore, when a call such as an built-in procedure, etc. is described in the declaration part, a conventional compiler cannot correctly compile the declaration part. However, the compiler according to the present embodiment has no such problems because it only replaces a call such as an built-in procedure, etc. with a procedure call in the object language.

According to the embodiment described above by referring to FIGS. 5 through 9, the conversion targets in a source program are not the same as each other. That is to say, in the example shown in FIG. 7A, the two conversion targets indicate the same function to be called, but different arguments.

However, there can be a plurality of the same conversion targets in a source program. In this case, if the source program is compiled by the compiler 10 shown in FIG. 5, the plurality of the same procedure codes (online code) are generated, thereby generating an excess number of output codes from the compiler. Described below is the compiler developed to solve this problem.

Figure 10:
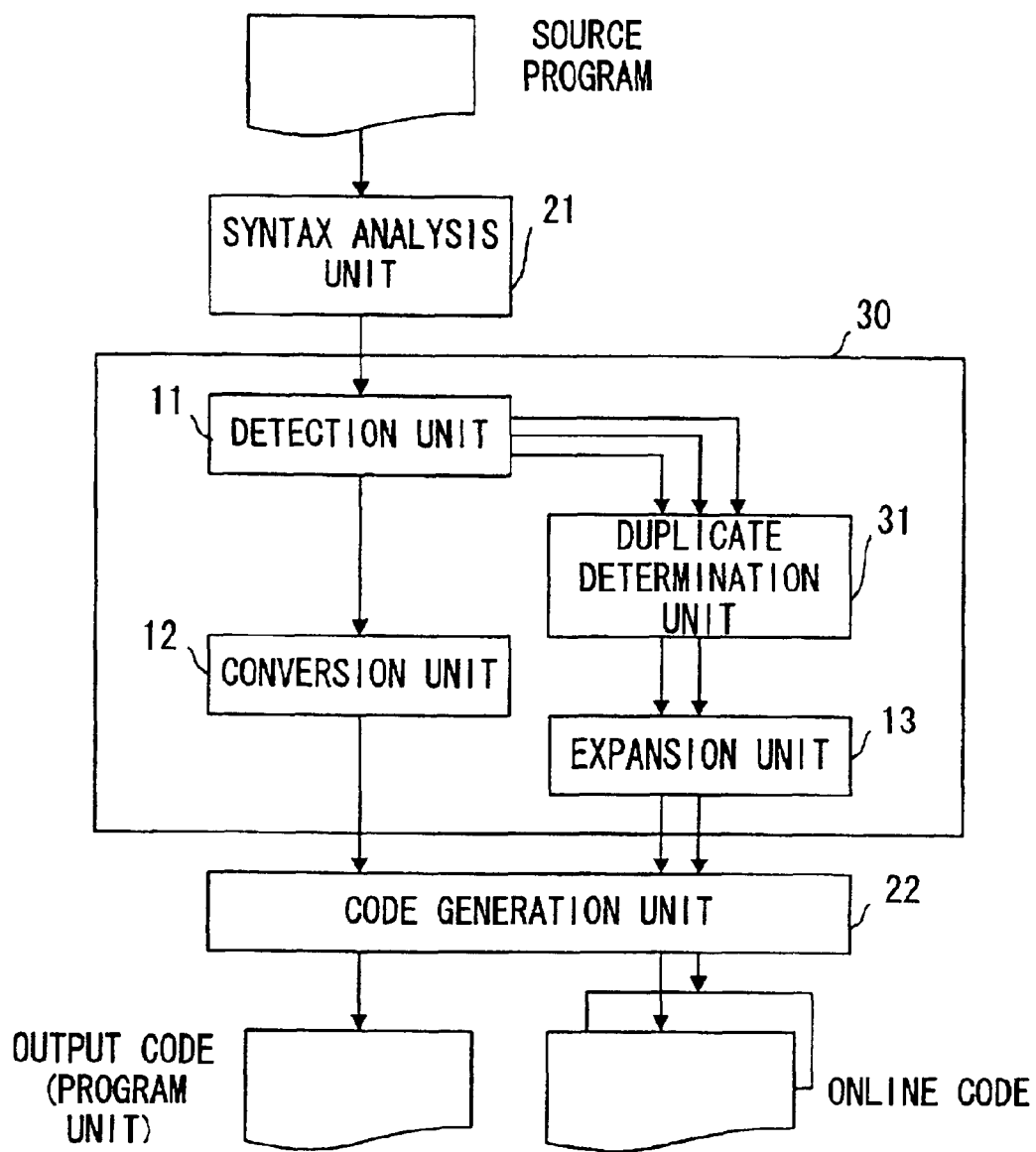
FIG. 10 is a block diagram of the compiler according to another embodiment of the present invention.

FIG. 10 is a block diagram of the compiler according to another embodiment of the present invention. The units with the same reference numbers in FIG. 5 and FIG. 10 have the same functions. That is to say, in a compiler 30, the detection unit 11, the conversion unit 12, and the expansion unit 13 are basically the same as those of the compiler 10 shown in FIG. 5.

The compiler 30 comprises a duplicate determination unit 31. The duplicate determination unit 31 checks whether there are the same conversion targets in the plurality of conversion targets detected by the detection unit 11 in the source program, and notifies the conversion unit 12 and the expansion unit 13 of the check result. Unless there are the same conversion targets, the conversion unit 12 and the expansion unit 13 perform the operations described by referring to FIGS. 5 through 9. On the other hand, if there are the same conversion targets, the conversion unit 12 converts them into the same calls, and the expansion unit 13 generates only one procedure code (online code) to be commonly called by the calls.

FIG. 11 is a flowchart of the operations of the compiler shown in FIG. 10.

In step S11, the duplicate determination unit 31 first clears the memory area R (management table) to be used. In the memory area R, the characteristics of the conversion targets in the source program are entered, and a procedure name uniquely assigned to each characteristic is also entered. In step S12, as in step S1 shown in FIG. 6, the conversion targets C1, ..., Cn are detected in a program P.

The processes in steps S13 through S19 are performed for each of the conversion targets C1, ..., Cn detected in step S12. In step S13, as in step S2 shown in FIG. 6, the characteristic $A_i$ of the conversion target $C_i$ is extracted. In step S14, it is determined whether the characteristic $A_i$ matches any of the characteristics of the conversion targets C1, ..., Ci-1 already processed in steps S14 through S19. If the characteristic $A_i$ matches any of the characteristics of the conversion targets C1, ..., Ci-1 already processed in steps S14 through S19, then control is passed to step S19. If it does not match any of them, control is passed to step S15.

In step S15, the memory area R is searched, and a unique procedure name fi in the program P is generated for the conversion target Ci. In step S16, as in step S4 shown in FIG. 6, the conversion target Ci is replaced with a call for the procedure fi. In step S17, as in step S5 shown in FIG. 6, a procedure code Si corresponding to the characteristic $A_i$ is generated. The fi is specified as a procedure name of the procedure code Si. In step S18, both of the characteristic $A_i$ of the conversion target Ci and the fi as a procedure name for calling a corresponding procedure code Si are entered in the memory area R.

On the other hand, in step S19, the conversion target Ci is replaced with the call for the procedure fj for calling a procedure code Sj corresponding to a characteristic $A_j$. When the process in step S19 is w performed, no new procedure codes are generated, or no new records are entered in the memory area R.

After the processes in steps S13 through S19 are performed on all conversion targets C1, ..., Cn, each of the conversion targets C1, ..., Cn in the program P is replaced with the call for the procedures f1, ..., fm ($m \leq n$). In addition, the procedure codes S1, Sm are generated corresponding to the calls of the procedures f1, ..., fm, respectively. In step S20, the program P' obtained by replacing each conversion target with a call for a procedure, and a generated procedure code are output. The program P' and the procedure codes S1, ..., Sm can be output to the same file, or can be output to different files.

Thus, using the compiler 30, a minimal number of procedure codes are generated for duplicate conversion targets in a source program without generating duplicate procedure codes, thereby reducing the total number of output codes from the compiler.

Described next is a practical embodiment. In the following descriptions, the source program shown in FIG. 12A is input to the compiler 30, and the call for the function SUM is a conversion target. It is also assumed that the compiler 30 uses the template shown in FIG. 8.

When a source program is input, the compiler 30 detects the call for the function SUM by scanning the source program. In the example shown in FIG. 12A, the function SUM is called by the "SUM(A)" and "SUM(A2)" in line 4, by the "SUM(N(51:100))" in line 5, and by the "SUM(M (51:200))" in line 6.

The compiler 30 first extracts the characteristics of the "SUM(A)", and performs an online expanding operation based on the characteristics. The result of the online expanding operation is the same as the result of the above described expansion by the compiler 10, and a procedure code shown in FIG. 9A is generated. In addition, the operation of replacing the "SUM(A)" with the "SUM_SAMPLE_1(A)" is also described above.

However, in the compiler 30, the name of a call for calling a generated procedure code, and the characteristics of the procedure are sequentially entered in the management table to avoid the duplicate generation of the same procedure codes. The "characteristics" includes the type of an argument, the dimensionality of the argument, and the lower and upper limits of each dimension of the argument. Therefore, when the online expansion is performed on the "SUM(A)", a record corresponding to the "SUM(A)" is entered as shown in FIG. 13A.

Then, the compiler 30 extracts the characteristics of the "SUM(A2)", and compares the characteristics of the call already entered in the management table with the extracted characteristics as shown in FIG. 13B. In this example, since the characteristics of the "SUM_SAMPLE_1(A)" completely match those of the "SUM(A2)", the "SUM(A2)" is converted into the "SUM_SAMPLE_1 (A2)" to call the procedure code generated for the "SUM(A)" from the "SUM (A2)" without newly generating a procedure code for the "SUM(A2)". As a result, the line 4 of the source program is converted as follows.

"B=SUM(A)+SUM(A2)" into "B=SUM_SAMPLE_1 (A)+SUM_SAMPLE_1(A2)"

Therefore, when this line is executed, the procedure code shown in FIG. 9A is called by the "SUM_SAMPLE_1(A)", and then the same procedure code is called also by the "SUM_SAMPLE_1(A2)".

Since the characteristics of the "SUM_SAMPLE_1(A)" completely match those of the "SUM(A2)", no new records are added to the management table, and the management table holds the state shown in FIG. 13A.

Then, the compiler 30 extracts the characteristics of the "SUM(N(51:100))", and compares the characteristics of the call entered in the management table with the newly extracted characteristics as shown in FIG. 13C. In this example, since the characteristics of the "SUM_SAMPLE_1(A)" do not match those of the "SUM(N(51:100))", a procedure code corresponding to the "SUM (N(51:100))" is newly generated. The procedure code is the same as the procedure code shown in FIG. 9B.

The compiler 30 searches the management table, determines the name not entered yet ("SUM_SAMPLE_2" in this case), and assigns it to the "SUM(N(51:100))". Then, the line 5 of the source program is rewritten as follows. This process is the same as the process described by referring to FIGS. 5 through 9.

"WRITE(*,*) SUM(N(51:100))" into "WRITE(*,*) SUM_SAMPLE_2(N(51:100))"

The name to be newly used and the corresponding characteristics are entered in the management table.

In addition, the compiler 30 performs the similar processes on the "SUM(M(51:200))". In this case, as shown in FIG. 13D, the characteristics of the "SUM(M(51:200))" is similar to those of the previously entered "SUM_SAMPLE_2". However, since they do not completely match, a procedure code corresponding to the "SUM(M (51:200))" is newly generated. FIG. 14 shows the newly generated procedure code.

The compiler 30 searches the management table, determines a name not previously entered ("SUM_SAMPLE_3"), and assigns it to the "SUM(M(51:200))". Then, the line 6 of the source program is rewritten as follows.

"WRITE(*,*) SUM(M(51:200))" into "WRITE(*,*) SUM_SAMPLE_3(M(51:200))"

Thus, when the source program shown in FIG. 12A is input, the compiler 30 outputs the object code shown in FIG. 12B, and the procedure codes shown in FIGS. 9A, 9B, and 14. The procedure code shown in FIG. 9A is commonly called by two calls. That is to say, according to the above described embodiment, four targets to be converted from the source program are detected, however, there are three generated procedure codes. Thus, when there are a plurality of the same conversion targets in a source program, the total number of output codes is reduced as compared with the compiler 10 shown in FIG. 5.

According to the embodiments shown in FIGS. 10 through 14, the procedure code of the function SUM is generated using the template shown in FIG. 8. If the abstract level in the representation of a template is higher, the number of generated procedure codes can be furthermore reduced.

FIG. 15 shows an example of the template generated in the representation of a higher abstract level than the template shown in FIG. 8. The template shown in FIG. 8 has the format in which the procedure is expanded using, as parameters, an argument type, the dimensionality of the argument, and the upper and lower limits of each dimension of the argument. On the other hand, the template shown in FIG. 15 has the format in which the procedure is expanded only using, as parameters, an argument type and the dimensionality of the argument. Therefore, when the template shown in FIG. 15 is used, the non-matching between the lower limit and the higher limit of each dimension of an argument is ignored as long as they match in the argument type and the dimensionality of the argument, thereby generating a procedure code independent of the size of an array.

FIG. 16 shows a parameter compared when a conversion target is expanded using the template shown in FIG. 15. FIG. 16 shows four conversion targets detected from the source program shown in FIG. 12A.

When the template shown in FIG. 15 is used, the parameters to be compared are the "argument type" and the "dimensionality of argument" of a conversion target. Therefore, the same procedure code is generated for the "SUM(A)" and the "SUM(A2)". Similarly, the same procedure code is generated for the "SUM(N(51:100))" and the "SUM(M(51:200))". That is to say, the compiler 30 generates one procedure code for the "SUM(A)" and the "SUM (A2)", and similarly generates one procedure code for the "SUM(N(51:100))", and the "SUM(M(51:200))". At this time, both of the "SUM(A)" and the "SUM(A2)" are converted into the same procedure call ("SUM_SAMPLE_1" in this example). Similarly, both of the "SUM(N(51:100))" and the "SUM(M(51:200))" are converted into the same procedure call ("SUM_SAMPLE_2" in this example).

FIG. 17 shows an output from the compiler 30 when the template shown in FIG. 15 is used. When the source program shown in FIG. 12A is input, the compiler 30 outputs the object code and two procedure codes (online codes) shown in FIG. 17, if the template shown in FIG. 15 is used. In this example, the procedure code A is called by the "SUM_SAMPLE_1", and the procedure code B is called by the "SUM_SAMPLE_2".

Although omitted in the example shown in FIG. 17, it is actually necessary to describe an interface declaration in the object code for the procedure code. For example, when an object code is generated as a Fortran 90 program, and if a conversion target in the source program is converted into a new procedure call, the compiler generates an interface declaration about the new procedure call. This is the same as in other embodiments.

In the embodiments shown in FIGS. 5 and 10, an input to the compiler is assumed to be one program. Actually, there are a number of cases in which files containing a plurality of source programs should be collectively compiled. Described below is a compiler for collectively compiling a file containing a plurality of source programs.

FIG. 18 is a block diagram of a compiler according to another embodiment of the present invention. The reference numbers already shown in FIG. 5 or 10 indicate the same functions.

A compiler 40 is basically the same as the compiler 30 shown in FIG. 10. However, the duplicate determination unit 31 provided in the compiler 30 checks whether duplicate conversion targets exist in each source program. On the other hand, a duplicate determination unit 41 provided in the compiler 40 checks whether duplicate conversion targets exist in each file. The conversion unit 12 and the expansion unit 13 are notified of the determination result from the duplicate determination unit 41. Upon receipt of the notification, the conversion unit 12 and the expansion unit 13 are operated mostly as the same manner as described above by referring to FIG. 10.

Figure 19:
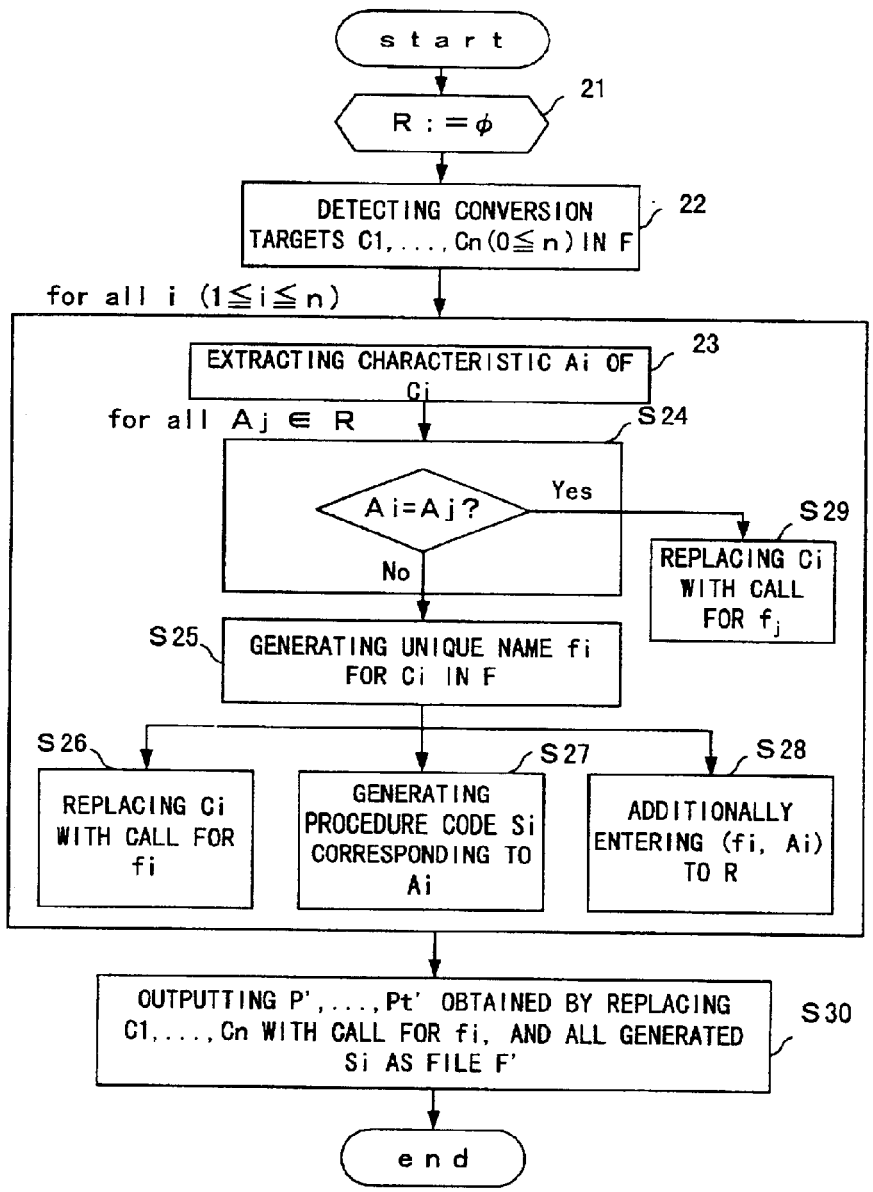
FIG. 19 is a flowchart of the operation of the compiler shown in FIG. 18.

FIG. 19 is a flowchart of the operations of the compiler shown in FIG. 18. In this example, the source file input to the compiler 40 is referred to as a file F, and the object file compiled by the compiler 40 is referred to as a file F'. In the following descriptions, the file F contains one or more source programs P1, . . . , Pt. This process is performed each time one source file is input.

The processes in steps S21 through S30 is basically the same as those in steps S11 through S20 respectively shown in FIG. 11. However, in steps S21 through S30, the processes are performed in file units. That is to say, in step S22, a conversion target is detected from one or more source programs in the file. In step S25, a unique name is generated for a conversion target in the file F.

When the file F containing the source programs P1, . . . , Pt is input, the compiler 40 generates object programs P'1, . . . , P't in which each conversion target is replaced with a procedure call, and also generates procedure codes S1, . . . , Sm corresponding to the calls for procedures, by performing the above described processes in steps S21 through S30. The generated object programs and procedure codes are output to the same file.

The procedure codes can be sequentially output one by one each time one procedure code is generated, can be output each time a process is completed for each program, or can be collectively output when a process is completed for the input file. When a source code comprises a plurality of files, the above described process is repeated for each file.

Thus, the compiler 40 generates a minimal number of procedure codes without duplicate procedure codes for duplicate conversion targets in a file containing a plurality of source programs, thereby furthermore reducing the total number of output codes.

Described below is a practical embodiment. In the following descriptions, it is assumed that the source file (tiny.f) shown in FIG. 20 is input to the compiler 40, and a call for the function SUM is aconversion target. It is also assumed that the compiler 40 uses the template shown in FIG. 8.

When a source file is input, the compiler 40 detects a call for the function SUM by scanning two programs (a main program and a subprogram) contained in the source file. In the example shown in FIG. 20, it is detected that the function SUM is called by the "SUM(A)" and "SUM(N(51:100))" in the main program, and by the "SUM(Q)" in the subprogram.

Then, the compiler 40 checks whether procedure codes to be generated will be the same based on the characteristics (argument type, dimensionality of argument, etc.) of each of the detected conversion targets. In this example, the characteristics of the "SUM(A)" are the same as those of the "SUM(Q)". Therefore, one procedure code is commonly generated for the "SUM(A)" and the "SUM(Q)". For the "SUM(N(51:100))", an independent procedure code is generated.

FIG. 21 shows an output from the compiler 40 when the source file shown in FIG. 20 is input. In this example, the name of a call is determined by the combination of the name of a procedure, a file name, and the occurrence order in the file. Therefore, both of the "SUM(A)" and the "SUM(Q)" are replaced with the "SUM_TINY_1". In addition, the "SUM(N(51:100))" is replaced with the "SUM_TINY_2".

The procedure code A and the procedure code B are called by the "SUM_TINY_1" and the "SUM_TINY_2", respectively.

Thus, the compiler 40 generates a commonly used procedure code when the same conversion targets exist in a file. Therefore, if a generated procedure code is output to the same file as the object program, files can be easily processed. For example, when the name of the input file is "tiny.f", then the name of the output file is "tiny.o". Both object program and procedure code are output to the file.

Figure 22:
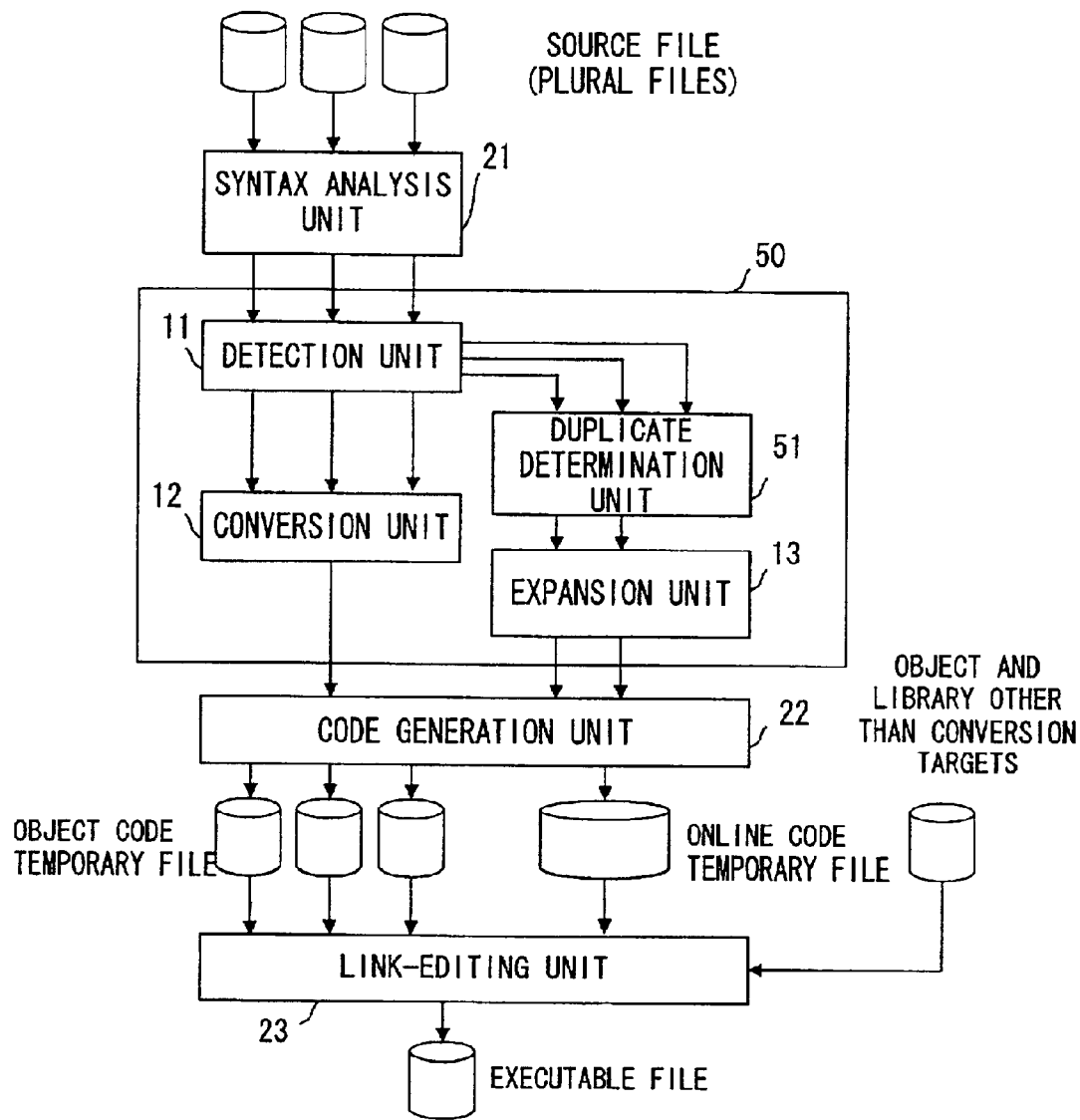
FIG. 22 is a block diagram of the compiler according to a further embodiment of the present invention.

FIG. 22 is a block diagram of the compiler according to another embodiment of the present invention. A compiler 50 converts the same conversion targets stored in a plurality of input files into the common procedure call in consideration of the plurality of files to be collectively input, and generates one procedure code for the procedure call. The procedure code is commonly used by a plurality of files, and commonly called by a plurality of procedure calls.

To realize the above described function, a duplicate determination unit 51 checks whether duplicate conversion targets exist in a plurality of input files, and notifies the conversion unit 12 and the expansion unit 13 of the determination result. Upon receipt of the notification, the conversion unit 12 and the expansion unit 13 operates as described above by referring to FIG. 10.

A link-editing unit 23 can be realized by an existing program, and generates an executable program by linking a compiled code with a data file. A file normally contains one or more program units (subroutines, functions, etc.). An executable file is generated by compiling the source codes of one or more files, and link-editing them. The link-editing unit 23 also has the function of generating a library.

Figure 23:
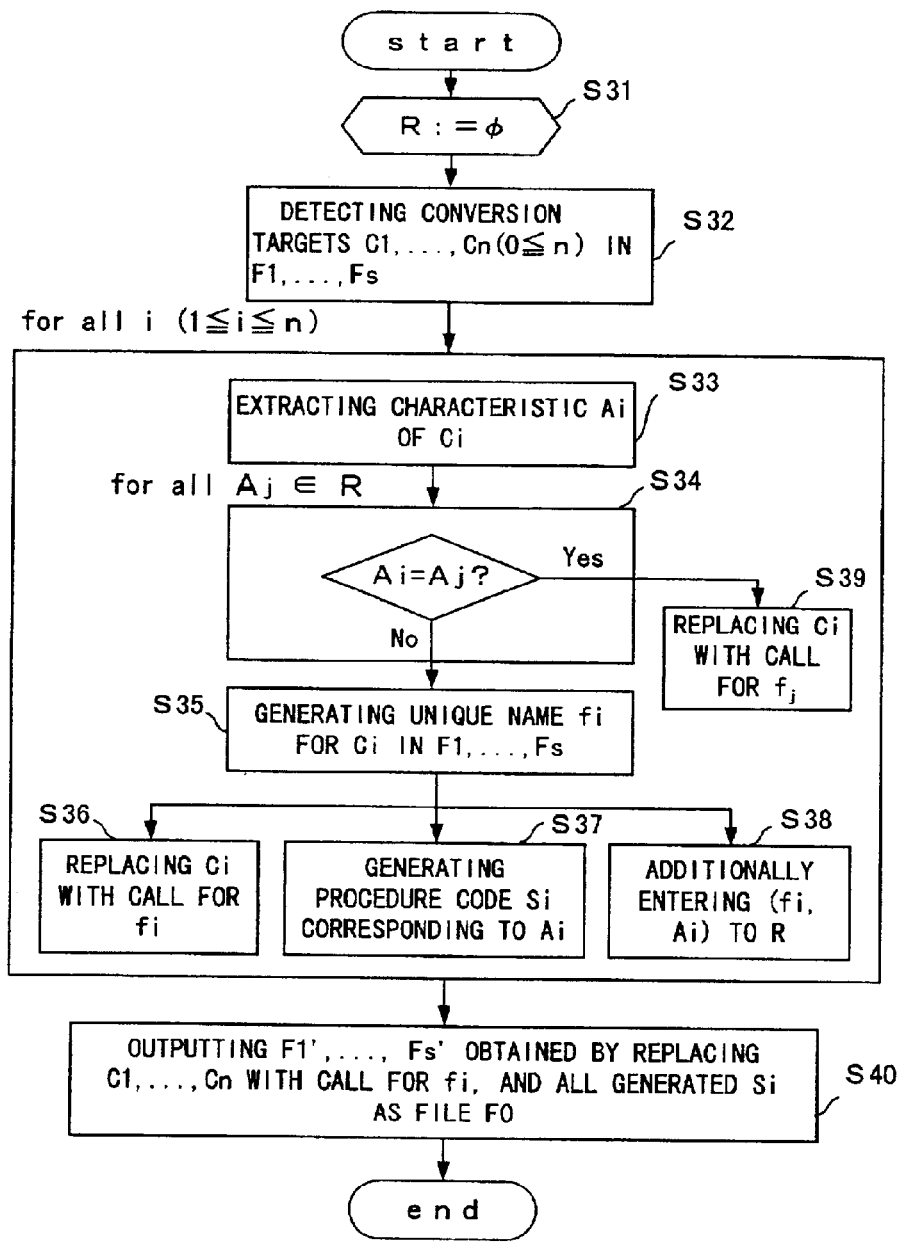
FIG. 23 is a flowchart of the operation of the compiler shown in FIG. 22.

FIG. 23 is a flowchart of the operations of the compiler shown in FIG. 22. In this example, a plurality of source files input to the compiler 50 are referred to as files F1, . . . , Fs, and the object files compiled by the compiler 50 are referred to as files F'1, . . . , F's. Each source file is assumed to contain one or more source programs. The process shown in FIG. 23 is performed each time a series of source files are input.

Each of the processes in steps S31 through S40 is basically the same as each of them in steps S11 through S20. However, in steps S31 through S40, a process is performed in a series-of-file units. That is, in step S32, conversion targets are detected from a plurality of source programs contained in the files F1, . . . , Fs. In step S35, a unique name in a series of files F1, . . . , Fs is generated for conversion targets. When an output file is a normal file processed by a user, an object code is associated with a procedure code (online code).

When the files F1, . . . , Fs are input, the compiler 50 generates an object program in which each of the conversion targets has been replaced with a call for a procedure, and outputs the files F'1, . . . , F's, by w executing the processes of the steps S31 through S40. Furthermore, the compiler 50 generates a procedure code corresponding to a call for each procedure, and outputs the procedure codes to a common file F0.

A procedure code can be sequentially output one by one each time one procedure code is generated, can be output each time a process is completed for each program, or can be collectively output when a process is completed in file units. In addition, a procedure code can be output to the same file as that containing an object file. The compiler 50 can manage an output file as a temporary file and perform a link-editing process to generate an executable file.

Thus, using the compiler 50, a minimal number of procedure codes are generated for duplicate conversion targets in a plurality of source files without generating duplicate procedure codes, thereby reducing the total number of output codes from the compiler.

Described next is a practical embodiment. In the following descriptions, it is assumed that the two source files (tiny1.f and tiny2.f) shown in FIG. 24 is input to the compiler 50, and the call for the function SUM is a conversion target. It is also assumed that the compiler 50 uses the template shown in FIG. 8.

When a source file is input, the compiler 50 detects a call for the function SUM by scanning the program (main program) contained in the file tiny1.f and the program (subprogram) contained in the file tiny2.f. In the example shown in FIG. 24, the function SUM is called by the "SUM(A)" and the "SUM(N(51:100))" in the file tiny1.f, and the "SUM(Q)" in the file tiny2.f.

Then, the compiler 40 checks whether procedure codes to be generated will be the same based on the characteristics (argument type, dimensionality of argument, etc.) of each of the detected conversion targets. In this example, the characteristics of the "SUM(A)" are the same as those of the "SUM(Q)". Therefore, one procedure code is generated and shared by the "SUM (A)" and the "SUM(Q)". For the "SUM(N(51:100))", one independent procedure code is generated.

FIG. 25 shows an output from the compiler 50 when the source file shown in FIG. 24 is input. In this example, the name of a call is determined by the combination of the name of a procedure and the occurrence order in a series of the input files. Therefore, both of the "SUM (A)" and the "SUM(Q)" are replaced with the "SUM_1". In addition, the "SUM(N(51:100))" is replaced with the "SUM_2". The procedure code A and the procedure code B are called by the "SUM_1" and the "SUM_2", respectively.

Thus, using the compiler 50, a procedure code is shared by a series of files simultaneously compiled. In the link-editing process, a file storing a procedure code is specified in the object file. The linking process can be performed by the compiler 50, or can be performed by a module other than a compiler as with the configuration shown in FIG. 22. When a link-editing process is performed by a compiler, a procedure code is stored in a temporary file, and the temporary file will be deleted after the compilation so that problems can be avoided in the association with the source.

According to the above described embodiment, a conversion target is "function SUM". However, it is obvious that other functions and subroutines can be similarly processed. In the following descriptions, it is assumed that a source program shown in FIG. 26A is input to the compiler 10 shown in FIG. 5, and "AN" is a conversion target. The "AN" indicates "A raised to the N-th power". The "A" is a real-type, complex-type, or integer-type scalar, and the "N" is an integer-type scalar.

When the compiler 10 detects the "AN", it generates an object program by converting the "AN" into "POW(A, N)", and outputs a procedure code (online code) to be called by the "POW(A, N)". The procedure is defined as, for example, "a multiplication is performed when N is equal to or smaller than 3, and powers calculation is performed when N is larger than 3".

The compiler 10 refers to the following three characteristics when it generates a procedure code corresponding to the "POW(A, N)".

characteristic 1: type of "A"
characteristic 2: whether the value of "N" can be obtained
characteristic 3: the value of "N" when it is obtained The compiler 10 comprises the templates shown in FIGS. 27A through 27D, 28A, and 28B as sample data used when a procedure code corresponding to the "POW(A, N)" is generated. In these templates, the above described characteristic 1 (type of "A") is abstracted.

The template shown in FIG. 27A is described corresponding to the case where "N" is "0". That is to say, when "N=0", "A" raised to the 0-th power constantly equals 1. Therefore, "R=1" is preliminarily set in this template.

Each of the templates shown in FIGS. 27B through 27D is described corresponding to the case where "N" is "1" through "3". In this example, it is assumed that a multiplication is preferable to powers calculation when "N" a small value. The multiplication ("R=A", "R=A*A", and "R=A*A*A") is preliminarily described in each template.

The template shown in FIG. 28A is described corresponding to the case where "N" is larger than "3". That is to say, an equation of powers calculation ("R=A**N") is preliminarily described.

The template shown in FIG. 28B is described corresponding to the case where the value of "N" is unknown when the source program is compiled. In this case, the template is described such that a calculation equation corresponding to the value of "N" is selected when the value is determined.

The compiler 10 detects the representation "AN" by searching each line when a source program is input. When the program shown in FIG. 26A is input, the "2LEN" in line 4 and the "(R*2)**2" in line 5 is detected.

First, the "2LEN" is expanded online. Since the "2LEN" is a conversion target first appearing in the program SUBP, it is assigned the name "POW_SUBP_1". Then, the following conversion is performed according to the above described conversion rules.

"REAL::(2**LEN−1)" into
"REAL::S(POW_SUBP_1(2,LEN)−1)"

Then, the following information is obtained by analyzing the argument.

characteristic 1: type is INTEGER
characteristic 2: the value of "N" is not obtained.
characteristic 3: none The compiler 10 generates an online code by selecting an appropriate template according to the obtained information. That is, since the value of "N" has not been obtained in this example, the template shown in FIG. 28B is selected, and the online code A shown in FIG. 26B is generated.

Similarly, the "(R*2)**2" is expanded online. Since the "(R*2)**2" is a conversion target second appearing in the program SUBROUTINE, it is assigned the name "POW_SUBP_2", and the following conversion is performed.

"M=PAI*(R*2)**2" into
"M=PAI*POW_SUBP_2(R*2),2)

Then, the following information is obtained by analyzing the argument.

characteristic 1: type is REAL
characteristic 2: the value of "N" has been obtained
characteristic 3: "N"=2

The compiler 10 selects the template shown in FIG. 27C according to the obtained information, and generates the online code B shown in FIG. 26B. Then, the compiler 10 outputs the online codes A and B together with the object program.

To reduce the overhead for calling an online code when a program is executed, the online code generated by the comparator according to the present embodiment can be expanded inline by the subsequent compiler (whose object language is a machine language, assembler, etc.). The inline expansion often causes a problem when a high-level language is processed using a preprocessor compiler as described above. However, using a normal compiler whose object language is a machine language, assembler, etc., the inline expansion can be performed without problems.

Figure 29:
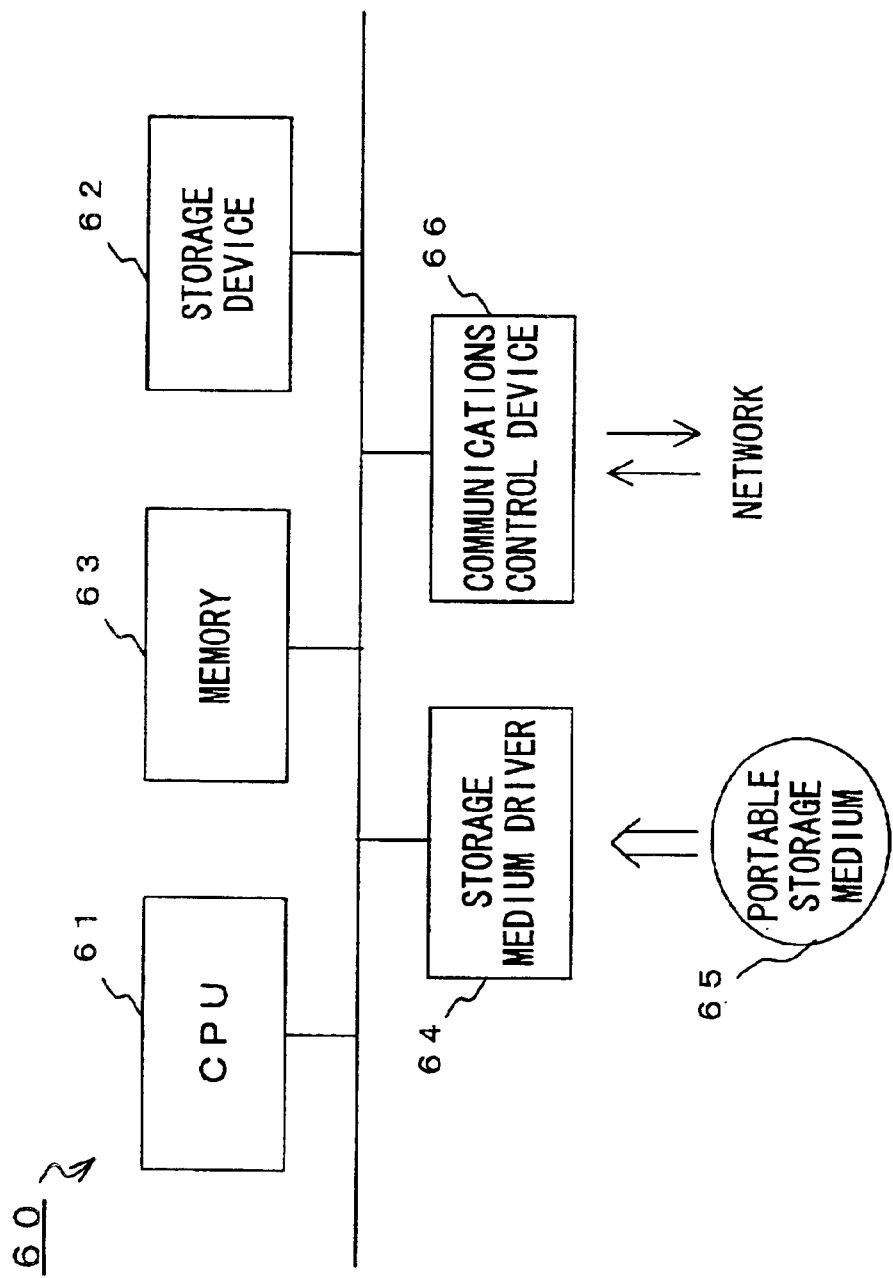
FIG. 29 is a block diagram of the software program according to the present invention.

The above described functions of the compiler can be realized by executing a program describing processes shown in the flowchart in FIG. 6, 11, 19, or 23 using a computer. FIG. 29 is a block diagram of a computer 60 which executes the program.

A CPU 61 loads a program describing the processes in the flowchart shown in FIG. 6, 11, 19, or 23 from a storage device 62 to memory 63, and executes the program. The storage device 62 is, for example, a hard disk, and stores the program, various templates, and so on. The memory 63 is, for example, a semiconductor memory, and is used as a work area of the CPU 61. The management table shown in FIG. 13A, etc. is generated in the memory 63.

A storage medium driver 64 accesses the portable storage medium 65 at an instruction of the CPU 61. A portable storage medium 65 can be a semiconductor device (IC card, etc.), a medium (floppy disk, magnetic tape, etc.) to and from which information is input and output in magnetic effects, and a medium (optical disk, etc.) to and from which information is input and output in optical effects. A communications control device 66 transmits and receives data to and from a network at an instruction of the CPU 61.

Figure 30:
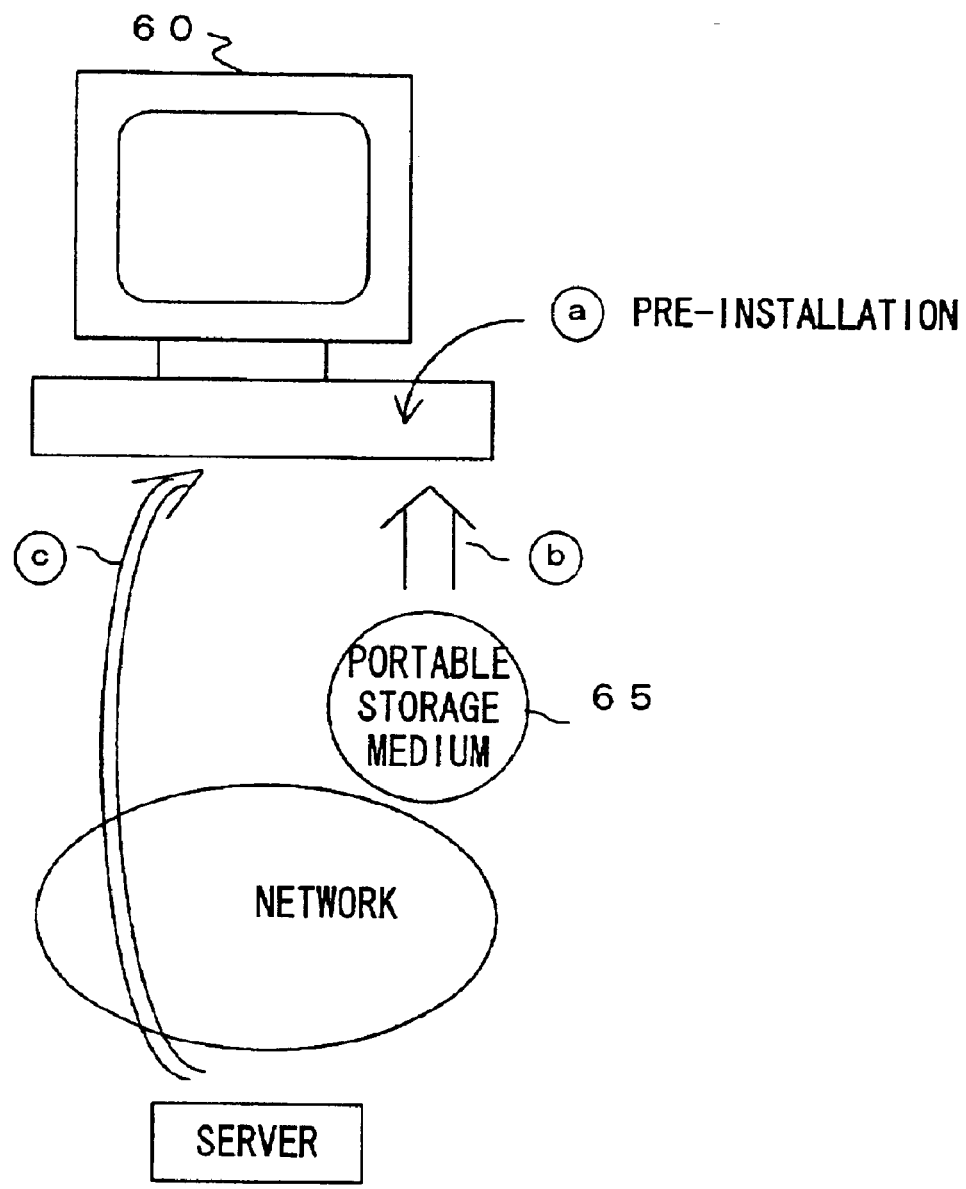
FIG. 30 shows the method of providing a software program according to the present invention.

FIG. 30 shows the method of providing a software program, etc. (including a template) according to the present invention. The program according to the present invention is provided by, for example, any method in the following three methods.

(a) Provided after being installed in the computer 60. In this case, the program, etc. is, for example, pre-installed before delivery.

(b) Provided as stored on a portable storage medium. In this case, the program, etc. stored on the portable storage medium 65 is basically installed in the storage device 62 through the storage medium driver 64.

(c) Provided by a server in a network. Basically in this case, the computer 60 obtains the program by download it from the server.

Thus, the compiler according to the present invention can easily expand a conversion target regardless of the appearance position of the conversion target in the source program even if the compiler is operated as a preprocessor.

In addition, even if a procedure call can be expanded inline, the compiler according to the present embodiment is advantageous in the total number of output codes and compilation time.

(a) Total Number of Output Codes

According to the compiler shown in FIGS. 10, 18, and 22, the total number of objects can be reduced because one online code is generated for a plurality of the same conversion targets, and the generated online code is commonly called by a plurality of procedure calls. The total number of outputs from the compiler shown in FIG. 5 is nearly equal to that output in the inline expansion.

(b) Compilation Time

Generally, the time required to perform the optimizing process in a compiler is normally proportional to the size of the compilation unit (a function, subroutine, etc.) raised to the second or third power. Therefore, when the number of codes in a compilation unit becomes several times of the original number, the process time for optimization may increase several tens times.

According to the compiler shown in FIG. 5, the total number of output codes is nearly equal to that in the case of the inline expansion. However, since an expansion code (online code) is generated as divided into compilation units, the entire compilation time can be shortened.

In the case of the compiler shown in FIGS. 10, 18, and 22, the number of the generated online codes is decreased, and therefore the compilation time can be furthermore shortened.

In addition, when the compiler according to the present embodiment is used, an error of an input code can be quickly detected if the input code is compiled before the online code is compiled and after the online expansion. When the inline expansion is performed, the input code becomes larger. As a result, it is predicted that a long time is required to detect an error.

The present invention can be widely used as a preprocessor system.

What is claimed is:

1. A compiler system for compiling a first program into a second program, comprising:
   a converter converting a part of the first program into a procedure call and generating the second program including the procedure call;
   a generator generating an expansion code describing a definition of a procedure to be called by the procedure call; and
   an outputting unit outputting the second program and the expansion code generated by said generator, and
   wherein the procedure call in the second program is expanded outside the second program and to be outputted as the expansion code.

2. The compiler system according to claim 1, further comprising a detector which detects a predetermined particular pattern from the first program, wherein
   said converter converts the pattern detected by said detector into a procedure call corresponding to the pattern.

3. The compiler system according to claim 2, wherein
   said detector detects a call for calling a built-in procedure from the first program.

4. The compiler system according to claim 2, wherein
   when said detection detects a plurality of identical patterns from the first program, said converter converts the plurality of patterns into a same procedure call.

5. A compiler system for receiving a first file containing one or more programs, compiling the one or more programs, and outputting a second file containing the one or more compiled programs, comprising:
   a detector detecting a predetermined particular pattern from one or more programs contained in the first file;
   a converter compiling the one or more programs contained in the first file by converting the pattern detected by said detector into a procedure call corresponding to the pattern;
   a generator generating an expansion code describing a definition of a procedure to be called by the procedure call; and
   an outputting unit outputting the one or more complied programs compiled by said converter and the expansion code generated by said generator, and
   wherein when said detector detects a plurality of identical patterns from the first file, said converter converts the plurality of patterns into a same procedure call, and the procedure call is expanded outside the one or more complied programs and to be outputted as the expansion code.

6. The compiler system according to claim 5, wherein said outputting unit outputs the code generated by said generator to the second file.

7. A compiler system for receiving a plurality of files each containing one or more programs, and compiling the programs contained in the received files, comprising:
- a detector detecting a predetermined particular pattern from the programs contained in the received files;
- a converter compiling the programs contained in the received files by converting the pattern detected by said detector into a procedure call corresponding to the pattern;
- a generator generating an expansion code describing a definition of a procedure to be called by the procedure call; and
- an outputting unit outputting a program compiled by said converter and the expansion code generated by said generator, and
- wherein when said detector detects a plurality of identical patterns from the plurality of received files, said converter converts the plurality of patterns into a same procedure call, and the procedure call is expanded outside the complied program and to be outputted as the expansion code.

8. A compiler system for compiling a first program into a second program, comprising:
- converting means for converting a part of the first program into a procedure call and generating the second program;
- generating means for generating an expansion code describing a definition of a procedure to be called by the procedure call; and
- outputting means for outputting the second program and the expansion code generated by said generating means, and
- wherein the procedure call in the second program is expanded outside the second program and to be outputted as the expansion code.

9. A method for compiling a first program into a second program, comprising:
- converting a part of the first program into a procedure call and generating the second program including the procedure call;
- generating an expansion code describing a definition of a procedure to be called by the procedure call; and
- outputting the second program and the generated expansion code, and
- wherein the procedure call in the second program is expanded outside the second program and to be outputted as the expansion code.

10. A computer-readable storage medium for storing a program used to direct a computer to compile a first program into a second program, said program comprising:
- a program code for converting a part of the first program into a procedure call and generating the second program including the procedure call;
- a program code for generating an expansion code describing a definition of a procedure to be called by the procedure call; and
- a program code for outputting the second program and the generated expansion code, and
- wherein the procedure call in the second program is expanded outside the second program and to be outputted as the expansion code.

11. A method for compiling a program containing a function, comprising:
- substituting a procedure call for the function;
- generating the program including the procedure call;
- generating expansion code defining a procedure to be called by the procedure call; and
- generating a subprogram containing the expansion code outside of the program expanding the procedure call.

* * * * *

UNITED STATES PATENT AND TRADEMARK OFFICE
CERTIFICATE OF CORRECTION

| | |
|---|---|
| PATENT NO. | : 7,073,167 B2 |
| APPLICATION NO. | : 09/835623 |
| DATED | : July 4, 2006 |
| INVENTOR(S) | : Hidetoshi Iwashita |

Page 1 of 1

It is certified that error appears in the above-identified patent and that said Letters Patent is hereby corrected as shown below:

Title Page Column 1 (Title), Line 1, After "SYSTEM" insert --,--.

Title Page Column 2 (Other Publications), Line 3, change "p." to --pp.--.

Title Page Column 2 (Other Publications), Line 5, change "p." to --pp.--

Title Page Column 2 (Other Publications), Line 8, change "p." to --pp.--

Column 1, Line 1, after "SYSTEM" insert --,--.

Signed and Sealed this

Second Day of January, 2007

JON W. DUDAS
*Director of the United States Patent and Trademark Office*